(12) United States Patent
Sugiyama

(10) Patent No.: US 7,603,002 B2
(45) Date of Patent: Oct. 13, 2009

(54) OPTICAL DEVICE

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 68 days.

(21) Appl. No.: 11/144,615

(22) Filed: Jun. 6, 2005

(65) Prior Publication Data

US 2006/0210212 A1 Sep. 21, 2006

(30) Foreign Application Priority Data

Mar. 18, 2005 (JP) ............................. 2005-079699

(51) Int. Cl.
*G02F 1/035* (2006.01)
(52) U.S. Cl. ............................................ 385/3; 385/40
(58) Field of Classification Search ............... 385/1–5, 385/8, 40
See application file for complete search history.

(56) References Cited

U.S. PATENT DOCUMENTS

| 4,781,424 A | 11/1988 | Kawachi et al. ............ 350/96.3 |
| 6,501,867 B2 * | 12/2002 | Gates et al. ..................... 385/2 |
| 7,088,875 B2 * | 8/2006 | Sugiyama et al. .............. 385/3 |

FOREIGN PATENT DOCUMENTS

| JP | 63-147145 | 6/1988 |
| JP | 5-232417 | 9/1993 |
| JP | 7-064031 | 3/1995 |
| JP | 9-288255 | 11/1997 |

OTHER PUBLICATIONS

M. Sugiyama, et al., "Optical Frequency Comb Generation Using $LiNbO_3$ Integrated Modulator (2)", The Institute of Electronics, Information and Communication Engineers: Autumn Conference 2004.
M. Sugiyama, et al. "A Low Drive Voltage $LiNbO_3$ Phase and Intensity Integrated Modulator for Optical Frequency Comb Generation and Short Pulse Generation", ECOC 2004.

* cited by examiner

*Primary Examiner*—Sarah Song
(74) *Attorney, Agent, or Firm*—Staas & Halsey LLP

(57) ABSTRACT

An optical device having a substrate having an electro-optical effect, an optical waveguide formed in the substrate, and an electric field emission electrode, and an electric field convergence electrode to which an electric field emitted from the electric field emission electrode converges. The optical waveguide is formed such that light propagating through the optical waveguide passes through an area under the electric field emission electrode or an area under the electric field convergence electrode and then passes through a remaining electrode. As a result, even when an interaction length is increased, the optical device acquires (increases) a modulation index appropriate to the increase in interaction length, thereby diminishing a drive voltage.

23 Claims, 12 Drawing Sheets

OPTICAL DEVICE

CROSS REFERENCE TO RELATED APPLICATIONS

This application is based on and hereby claims priority to Japanese Application No. 2005-79699 filed on Mar. 18, 2005 in Japan, the contents of which are hereby incorporated by reference.

BACKGROUND OF THE INVENTION (1) Field of the Invention

The present invention relates to an optical device used for optical communication, and more particularly, to a technique suitable for use in an optical device, such as an optical modulator having an optical waveguide structure.

(2) Description of Related Art

An optical communications device typified by an optical modulator using an electro-optical crystal, such as an $LiNbO_3$ [lithium niobate (LN)] crystal substrate or an $LiTaO_2$ [lithium tantalate (LT)] crystal substrate, is formed by placing electrodes in the vicinity of an optical waveguide after a metal film has been formed over a portion of the crystal substrate and then the film has been thermally diffused, or after a metal film has been patterned and the thus-patterned metal film has been subjected to proton exchange in a benzoic acid.

In the case of, e.g., an intensity modulator, the optical waveguide is formed from an incoming waveguide, an incoming Y-branched waveguide, intensity modulation waveguides (parallel waveguides), an outgoing Y-branched waveguide, and an outgoing waveguide. In the case of a phase modulator, the optical waveguide is formed from an incoming waveguide, phase modulation waveguides (linear waveguides), and an outgoing waveguide. A signal electrode (also called a "hot electrode") and an earth electrode (also called a "ground electrode") are provided on the respective modulation waveguides, to thus form a coplanar electrode. When a substrate (a Z-cut substrate) which is cut along the Z-axis direction of a crystal orientation is used, a change in refractive index due to an electric field in the direction Z is utilized. Therefore, the electrode is disposed immediately above the waveguide.

In the case of the intensity modulator, a signal electrode is patterned on one of the modulation waveguides (parallel waveguides), and the ground electrode is patterned on the remaining modulation waveguide. In the case of the phase modulator, the signal electrode is patterned on the modulation waveguide, and the ground electrode is patterned in parallel with the signal electrode. However, in order to prevent the signal electrode and the ground electrode from absorbing the light propagating through the modulation waveguide, a dielectric layer (a buffer layer) is interposed between the signal electrode, the ground electrode and an LN substrate. For instance, $SiO_2$ having a thickness of 0.2 to 1.0 μm is used as the buffer layer.

When such an optical communications device is driven at high speed, the terminal of the signal electrode and that of the earth electrode are connected together by means of a resistor, to thus form a traveling wave electrode. A microwave electric signal is applied to an input side of the electrode. In the case of the intensity modulator, the refraction factors of the two parallel waveguides (tentatively called A, B) are respectively changed by $+\Delta na$, $-\Delta nb$ by means of the electric field. Since a phase difference between the parallel waveguides A, B is also changed, signal light whose intensity has been modulated is output from the outgoing waveguide. Now, the effective refraction factor of the microwave is controlled by changing the cross-sectional profile of the electrode, to thus match the speed of light and that of the microwave, whereby a wide band optical response characteristic can be acquired.

As shown in, e.g., FIG. 9, such an intensity modulator 100-1 and a phase modulator 100-2 are connected in series (in any sequence), and both the intensity modulator and the phase modulator are driven by a microwave having a frequency of f0, so that an optical frequency comb generator is realized. Specifically, when a laser beam of single wavelength (frequency) is input from a light source (a laser diode: LD) 200, an optical output consisting of a plurality of wavelengths can be obtained. The interval of the wavelengths of the optical output corresponds to the frequency f0 of the input electric signal. Therefore, the optical output can be used as a multi-wavelength light source for WDM (Wavelength Division Multiplex) optical transmission by setting the frequency f0 to an integral multiple of 12.5 GHz. For example, as shown in FIG. 10, a wavelength filter (bandpass filter) 300 which exhibits a Gaussian filtering characteristic on a wavelength axis is connected in series subsequent to the phase modulator 100-2 and the intensity modulator 100-1. When CW light of single wavelength is input from the light source 200, an optical pulse wave having a frequency f0 can be acquired. Detailed descriptions in relation to the optical frequency comb generator are provided in, e.g., Non-Patent Documents 1, 2 which will be described later.

FIG. 11 is a schematic plan view showing a detailed example configuration of such an optical frequency comb generator. The optical frequency comb generator shown in FIG. 11 comprises, as constituent elements of the intensity modulator 100-1, an incoming waveguide 101, an incoming Y-branched waveguide 102, parallel waveguides 103A, 103B, an outgoing Y-branched waveguide 104, a signal electrode 109 arranged such that a part thereof overlaps one (103A) of the parallel waveguides 103A, 103B, and a ground electrode 110 arranged such that a part thereof overlaps the remaining one (103B) of the parallel waveguides 103A, 103B, all these constituent elements being provided on an LN substrate 100. The optical frequency comb generator further comprises, as constituent elements of the phase modulator 100-2, a phase modulation waveguide 105, a signal electrode 112 arranged such that a part thereof overlaps the phase modulation waveguide 105, and ground electrodes 113, 114 arranged on respective sides of the signal electrode 112 (the phase modulation waveguide 105) in parallel thereto.

In the case of this example, in order to reduce a required drive voltage by means of assuring the longest possible interaction length between light and electricity (the microwave), the phase modulation waveguide 105, the signal electrode 112, and the ground electrodes 113, 114, which are constituent elements of the phase modulator 100-2, assume a folded structure with respect to the longitudinal direction of the LN substrate 100. Outgoing light is output from the same side of the LN substrate 100 where the incoming light is input. FIG. 12 is a fragmentary enlarged cross-sectional view taken along A-A in FIG. 11. As mentioned previously, a dielectric layer (a buffer layer) 116 is interposed between the LN substrate 100, the signal electrode 112, and the ground electrodes 113, 114.

Other related-art techniques pertaining to the optical device using an optical waveguide are proposed in, e.g., Patent Documents 1 to 4 provided below.

The technique described in Patent Document 1 relates to an optical modulator, particularly, a Mach-Zehnder modulator, and is intended for rendering the modulator compact and easy to handle. A plurality of pairs of parallel waveguides of the Mach-Zehnder modulator are provided by folding the parallel waveguides at the end face of a substrate. Thus, the length of the substrate is shortened, thereby imparting the modulator with a compact rectangular shape. The resultant modulator can be made easy to handle, and the substrate can be made less susceptible to damage.

The technique described in Patent Document 2 is intended for providing a high-performance optical modulator which enables exhibition of a high-performance transmission characteristic by controlling wavelength chirping without deforming a modulated waveform of light intensity and which further reduces electrical crosstalk. In the optical modulator that is formed from at least two modulation electrodes and an optical waveguide and utilizes an electro-optical effect, the electrical crosstalk can be sufficiently diminished by arranging the two modulation electrodes in series with the waveguide direction of the optical waveguide.

Patent Document 3 aims at providing an optical waveguide element which produces two output light beams containing essentially no wavelength chirping; which exhibits little wavelength dependency; and which is easily integrated. To this end, a one-by-two Y-branched waveguide is connected to input sides of two parallel intermediate optical waveguides. A two-by-two 3 dB coupler is connected to output sides of the intermediate optical waveguides. Two sets of electrodes are provided on or in the vicinity of the two intermediate optical waveguides for changing the refraction factors of the optical waveguides. A complementary electric signal is applied to the two sets of electrodes. When the optical waveguide element of such a configuration is caused to perform switching or modulator operation, the rates of changes in the refraction factors of the two intermediate optical waveguides can be made equal to each other, with opposite signs. Accordingly, the wavelength chirping of the output light can be reduced to 0 with respect to any output light. Even when the light outputs are merged together, a merged signal of excellent quality which does not cause any disturbances in wavelength can be obtained. Consequently, when light is caused to have propagated through the fiber, no wavelength chirping appears. For this reason, there is yielded an advantage of light being less susceptible to influence of deterioration of a waveform, which would otherwise be caused by dispersion stemming from the fiber.

The technique described in Patent Document 4 relates to a waveguide-type Mach-Zehnder optical interferometer and enables stable operation of the optical interferometer which does not depend on a polarizing direction of incoming light, by virtue of locally controlling birefringence of two single-mode optical waveguides over a specific length by means of operation of an applied control groove.

[Patent Document 1] JP-HEI-5-232417A
[Patent Document 2] JP-HEI-7-64031A
[Patent Document 3] JP-HEI-9-288255A
[Patent Document 4] JP-SHO-63-147145A
[Non-Patent Document 1] Sugiyama et al., "Optical Frequency Comb Generation (2) using a $LiNbO_3$ Modulator," Autumn Meeting of The Institute of Electronics, Information and Communication Engineers, 2004.
[Non-Patent Document 2] M. Sugiyama et al., "A low drive voltage $LiNbO_3$ phase and intensity integrated modulator for optical frequency comb generation and short pulse generation," ECOC 2004.

In order to increase the number of wavelengths output from the above-described optical frequency comb generator or to reduce the width of a pulse at the time of generation of the pulse, the voltage (drive voltage) input to the phase modulator 100-2 must be increased, to thus increase a modulation index. However, since a ceiling is imposed on an output from the electrical amplifier, the number of wavelengths is limited. For this reason, a reduction in the drive voltage (a half-wavelength voltage) $V\pi$ of the phase modulator 100-2 poses a problem. The essential requirement for reducing the drive voltage $V\pi$ is to increase the interaction length to the greatest possible extent. However, a restriction is imposed on the size of the substrate, and hence a limit is imposed on an increase in interaction length. Even if the interaction length has been made long, a modulation index consistent with the thus-increased interaction length cannot be obtained, for reasons of attenuation of the microwave traveling through the signal electrode 105. A limit is also imposed on reduction of the drive voltage $V\pi$. In this respect, all of the above-described related-art techniques are the same as this technique.

SUMMARY OF THE INVENTION

The present invention has been conceived in light of such a drawback and aims at providing an optical device which, even when the interaction length has been increased, acquires (increases) a modulation index consistent with an increase in interaction length to thus lower a drive voltage.

To achieve the object, the optical device of the present invention comprises:

(1) a substrate having an electro-optical effect; an optical waveguide formed in the substrate; and an electrode section which has a signal electrode and a ground electrode for applying an electric field to the optical waveguide in order to control a phase of light propagating through the optical waveguide, wherein the optical waveguide is formed so as to pass through, in a predetermined sequence, a position where the light propagating through the optical waveguide is exposed to the electric field emitted from the signal electrode of the electrode section and a position where the light is exposed to the electric field converging to the ground electrode of the electrode section.

(2) Here, the optical waveguide may be formed so as to pass through an area under the signal electrode and an area under the ground electrode.

(3) Further, the electrode section may have the signal electrode, and two ground electrodes disposed on the respective sides thereof, and the optical waveguide may be formed so as to pass through an area under the signal electrode and areas under the respective ground electrodes.

(4) Moreover, the optical waveguide may be formed on the substrate while being folded a plurality of times in a longitudinal direction of the substrate so as to pass through an area under the ground electrode after having passed through an area under the signal electrode.

(5) An optical device of the present invention also comprises: a substrate having an electro-optical effect; a pair of intensity modulation optical waveguides formed in the substrate; a phase modulation optical waveguide which is in mutual communication with the pair of optical waveguides; an intensity modulation electrode section which is formed from a signal electrode and a ground electrode for applying an intensity modulation electric field to the intensity modulation optical waveguide in order to control the phase of light propagating through the pair of intensity modulation optical waveguides; and a phase modulation electrode section which is formed from a signal electrode and a ground electrode for applying a phase modulation electric field to the phase modulation optical waveguide in order to control the phase of light propagating through the phase modulation optical waveguide, wherein the phase modulation optical waveguide is formed so as to pass a position where the light is exposed to the phase modulation electric field emitted from the signal electrode of the phase modulation electrode section and either or both of a position where the light is exposed to the phase modulation electric field converging toward the ground electrode of the phase modulation electrode section and a position where the light is exposed to an intensity modulation electric field converging to the ground electrode of the intensity modulation electrode section.

(6) An optical device of the present invention further comprises: a substrate having an electro-optical effect; an optical waveguide formed in the substrate; an electric field emission electrode; and an electric field convergence electrode to which an electric field emitted from the electric field emission electrode converges, wherein the optical waveguide is formed such that light propagating through the optical waveguide passes through either an area under the electric field emission electrode or the electric field convergence electrode and then passes through an area under the remaining electrode.

The above-described present invention primarily yields the following effects or advantages:

(1) The optical waveguide is formed in the substrate such that the light passing through the optical waveguide passes through, in a predetermined sequence, the position where the light passing through the optical waveguide is exposed to the electric field emitted from the signal electrode of the electrode section and the position where the light passing through the optical waveguide is exposed to the electric field converging at the ground electrode of the electrode section. Put another way, the optical waveguide is formed so as to pass through either an area under the electric field emission electrode or an area under the electric field convergence electrode, and then pass through the remaining electrode. Hence, the electric field emitted from the neighborhood of the signal electrode section and the electric field converging at the neighborhood of the ground electrode can be utilized for optical phase modulation. Even when the length of the waveguide (the length of interaction between light and electricity) is increased, the modulation index is increased by use of the electric field developing from the area under the ground electrode, thereby acquiring (increasing) a modulation index by the amount appropriate to the increase. Consequently, it becomes possible to increase the number of output wavelengths of the multiwavelength light source, to narrow the pulse width of the pulse light source, or to reduce the drive voltage (half wavelength voltage) for the multiwavelength light source and the pulse light source.

(2) When two ground electrodes are provided on respective sides of the signal electrode, the optical waveguide is formed so as to pass by the area under the signal electrode and the area under the respective ground electrodes, so that the modulation index can be increased while a longer interaction length is ensured.

(3) Further, the optical waveguide is formed on the substrate while being folded a plurality of times in the longitudinal direction of the substrate, so as to pass through an area under the ground electrode after having passed through the area under the signal electrode. As a result, even when a limitation is imposed on the size of the substrate, the modulation index can be increased while the longest-possible interaction length is ensured.

DESCRIPTION OF THE PREFERRED EMBODIMENTS

[A] Description of First Embodiment

Figure 1:
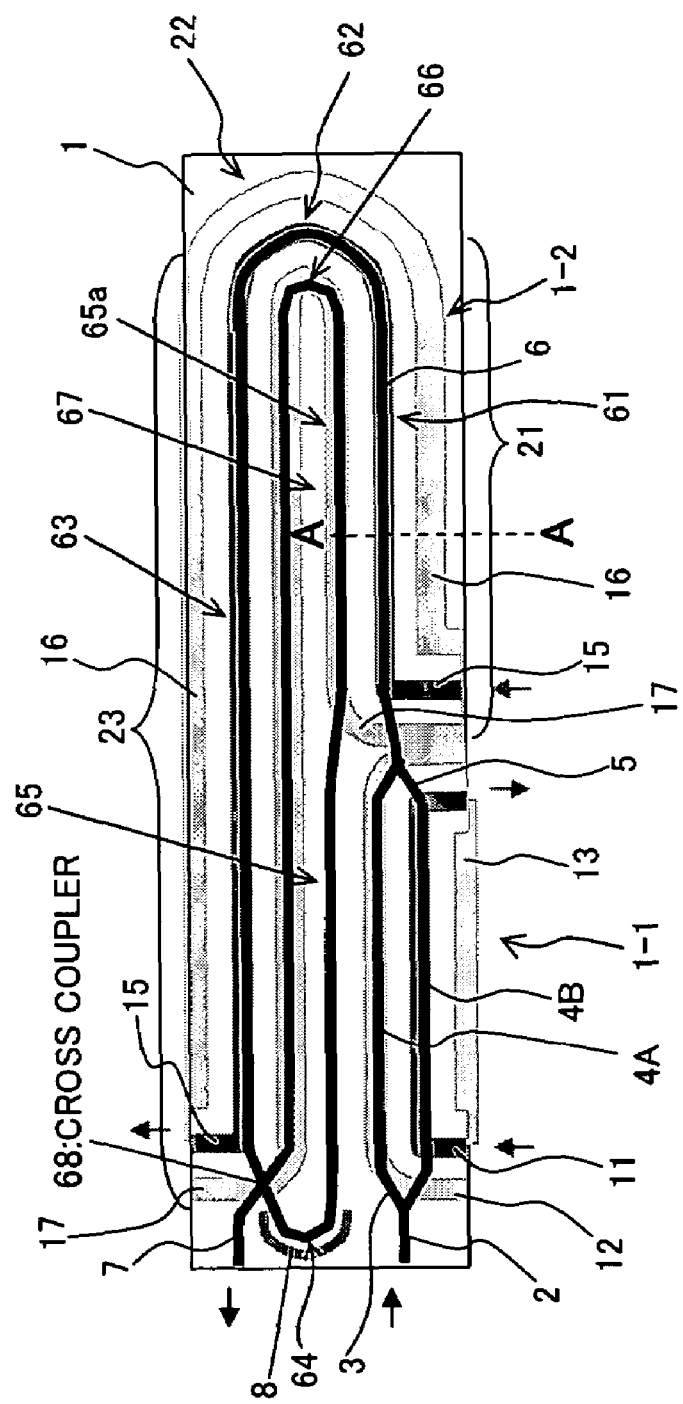
FIG. 1 is a schematic plan view showing the configuration of an optical modulator (an optical frequency comb generator) employed as an optical device according to a first embodiment of the present invention.
Figure 2:
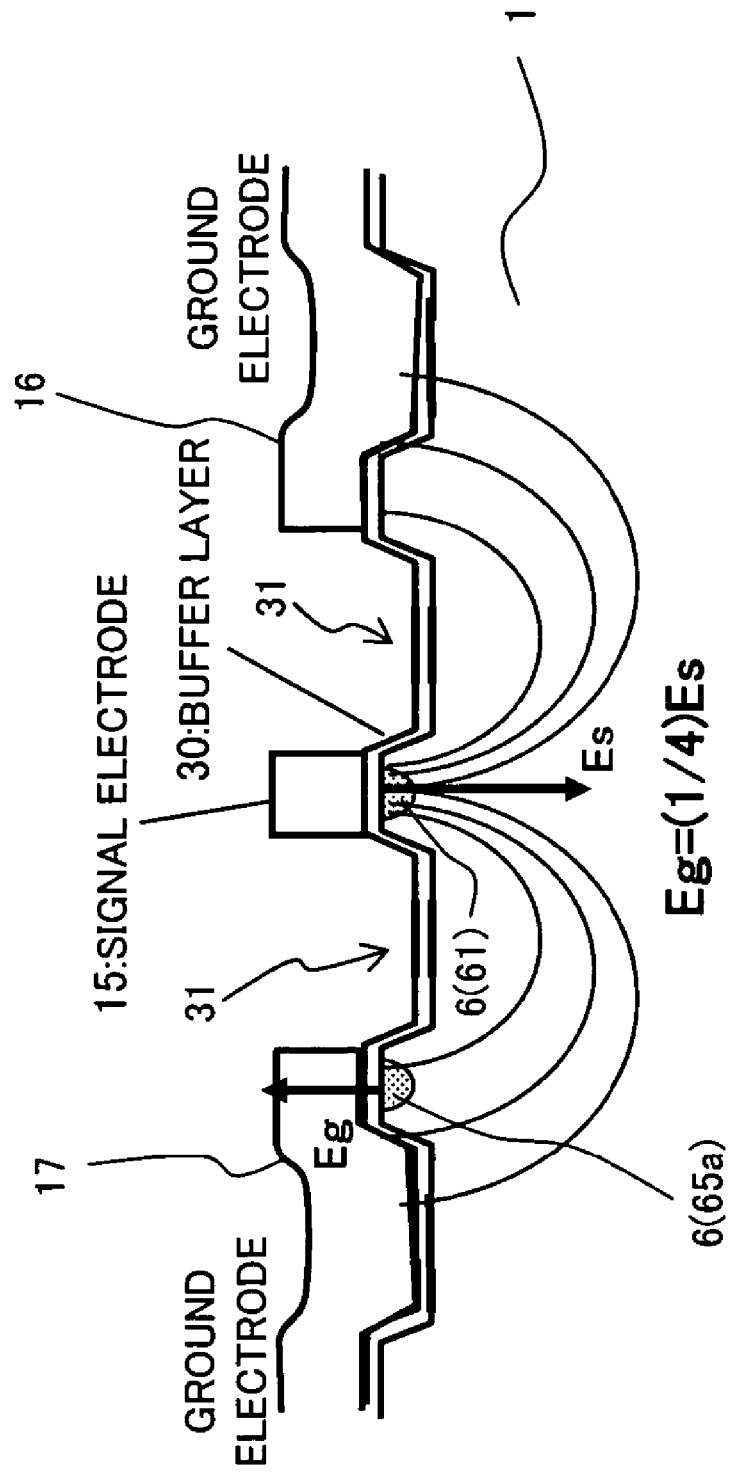
FIG. 2 is a schematic cross-sectional view showing a cross sectional profile taken along A-A shown in FIG. 1 in conjunction with electric lines of force of an applied electric field.
Figure 9:
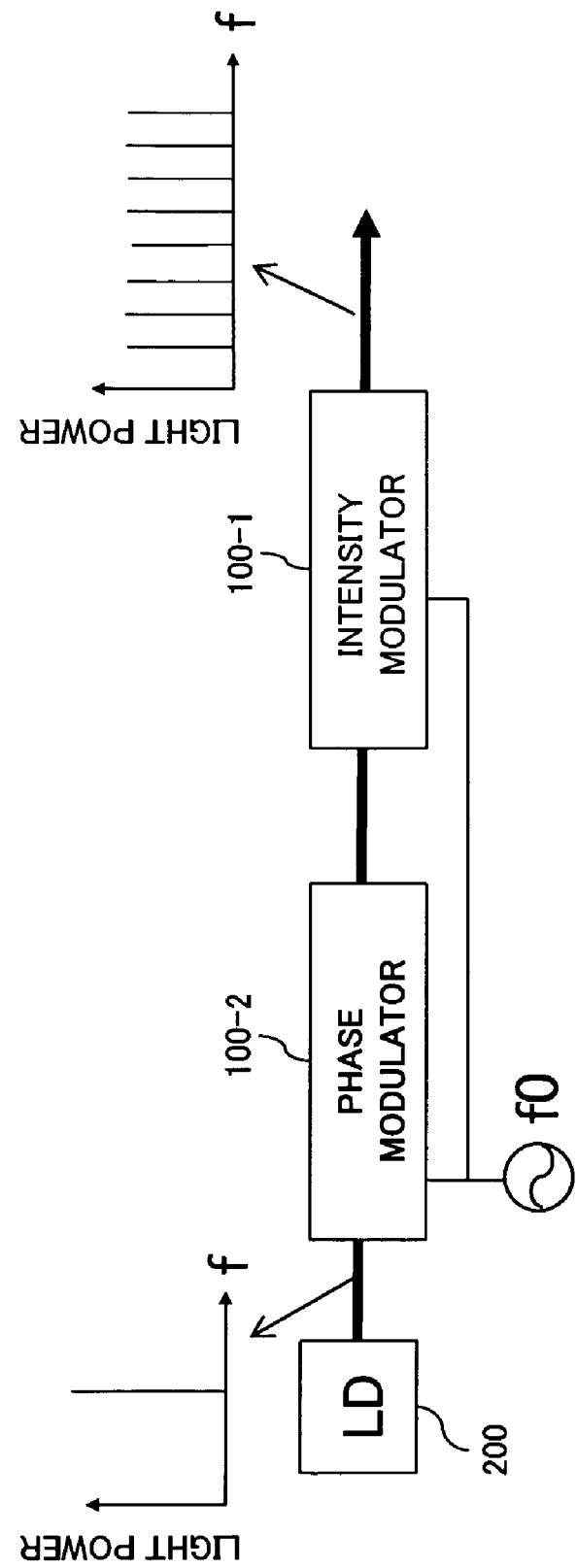
FIG. 9 is a block diagram showing an example configuration of a conventional optical frequency comb generator (a multiwavelength light source)
Figure 10:
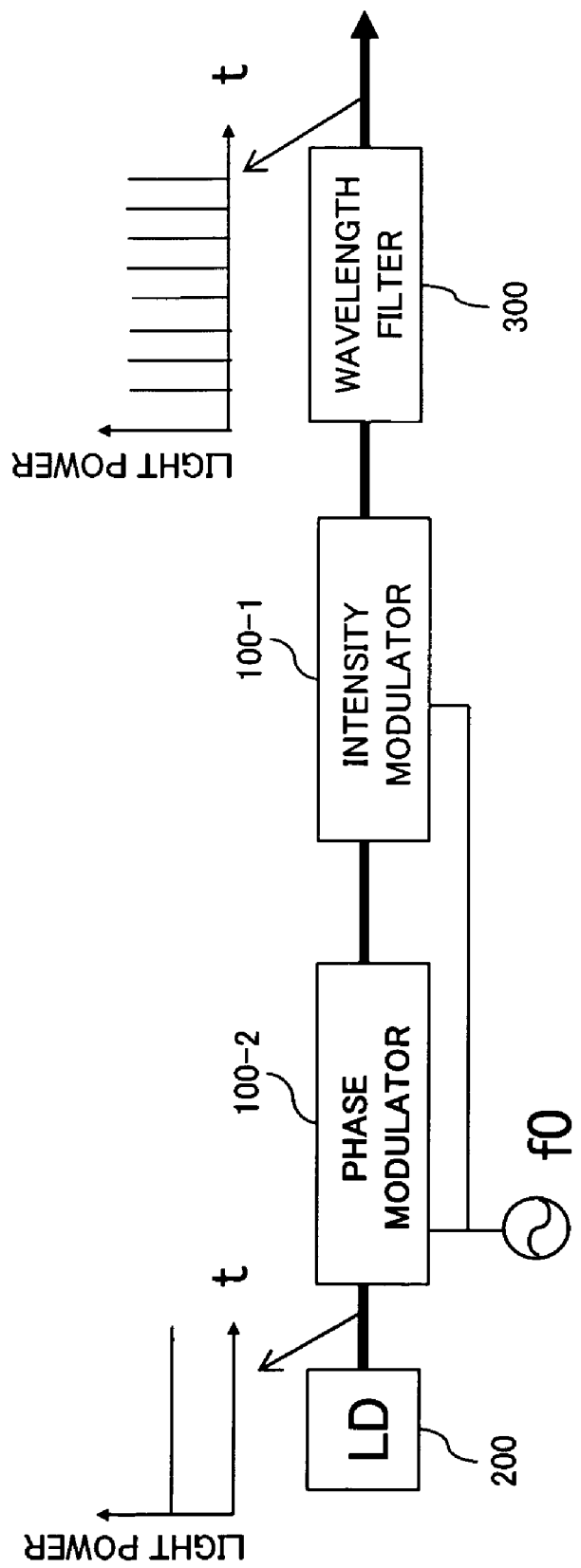
FIG. 10 is a block diagram showing an example configuration of a pulse light source utilizing a conventional optical frequency comb generator.
Figure 11:
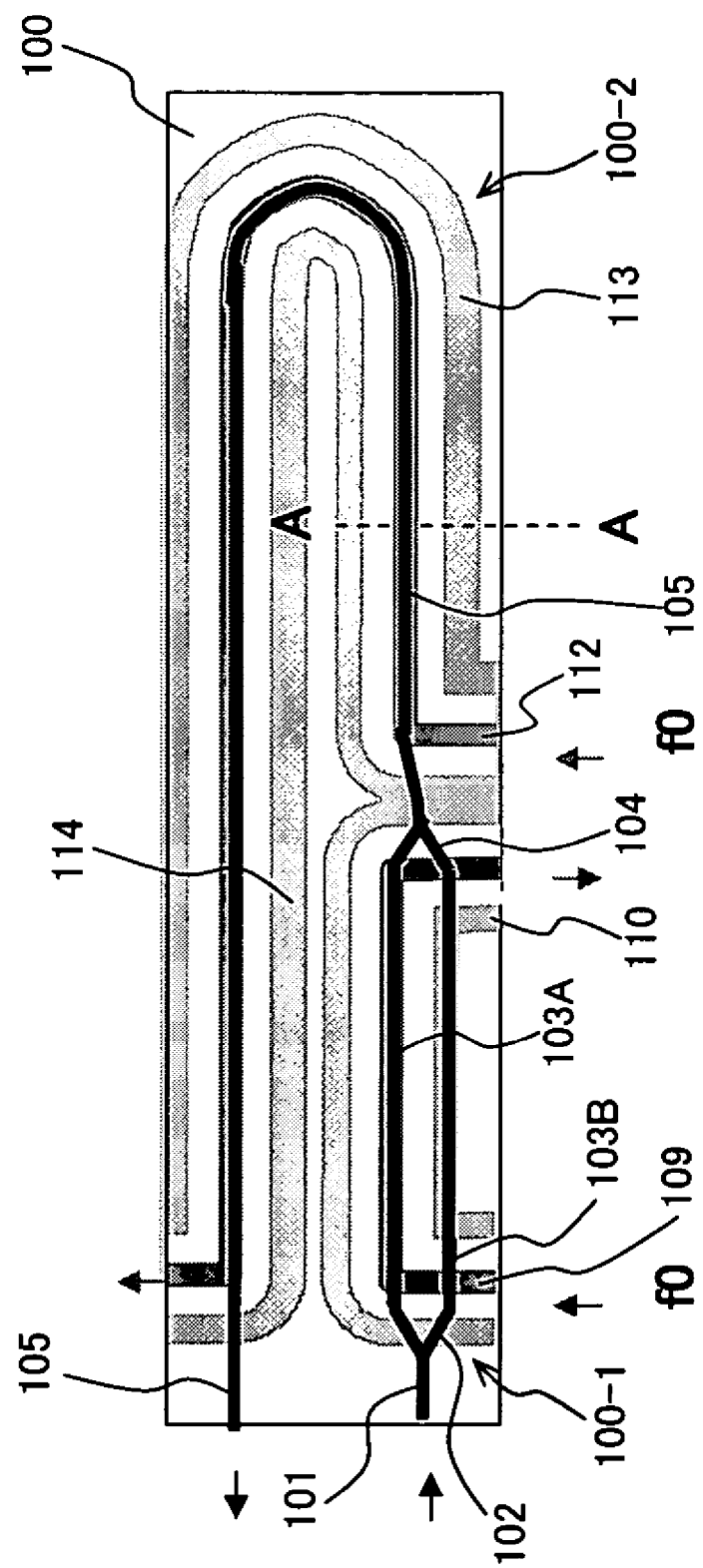
FIG. 11 is a schematic plan view showing the structure of the optical frequency comb generator shown in FIG. 9.
Figure 12:
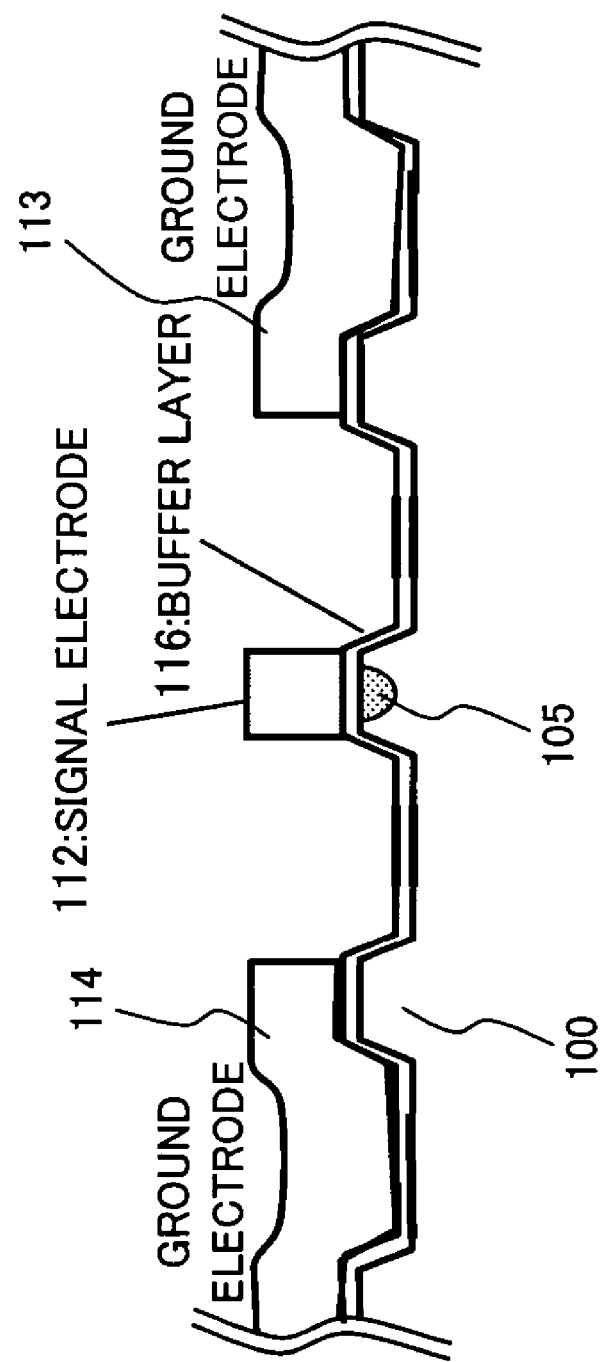
FIG. 12 is a cross-sectional view taken along A-A shown in FIG. 11.

FIG. 1 is a schematic plan view showing the configuration of an optical modulator (an optical frequency comb generator) serving as an optical device according to a first embodiment of the present invention. FIG. 2 is a schematic cross-sectional view showing a cross sectional profile taken along A-A shown in FIG. 1 in conjunction with electric lines of force of an applied electric field. As shown in FIG. 1, the optical frequency comb generator of the present embodiment comprises a first optical modulator (an intensity modulator) 1-1 having a waveguide structure and a second optical modulator (a phase modulator) 1-2 connected in series with the intensity modulator 1-1, both of which are formed (integrated) on a substrate 1 exhibiting an electro-optical effect; e.g., an LN crystal or an LT crystal. The optical frequency comb generator can be applied as a multiwavelength light source (see FIG. 9), or as a pulse light source by addition of a wavelength filter as previously mentioned by reference to FIG. 10.

Specifically, as shown in FIG. 1, an incoming waveguide 2 for letting input light propagate, an incoming Y-branched waveguide (branch section) 3 for bifurcating the input light, parallel waveguides (an arm section and an intensity modulation waveguide section) 4A, 4B which are to become areas where light and electricity (a microwave) interact with each other, and an outgoing Y-branched waveguide 5 are formed, as elements constituting the intensity modulator 1-1, on the substrate 1. Further, an optical waveguide 6 having a three-folded geometry is formed as an element constituting the phase modulator 1-2. The optical waveguide 6 is a phase modulation waveguide which is in mutual communication with the outgoing Y-branched waveguide 5 and forms an interaction area. In order to ensure as long interaction length as possible, the optical waveguide 6 is folded three times in the longitudinal direction of the substrate 1 at three folded sections (curved waveguide sections) as designated by reference numerals 62, 64, and 66. The other end of the optical waveguide 6 is formed as an outgoing waveguide 7.

Even in the present embodiment, the respective optical waveguides (reference numerals thereof are omitted) are formed by forming a metal film in some areas of the substrate 1 or by patterning a metal film and subjecting the patterned metal film to proton exchange in a benzoic acid. When a substrate 1 which is cut in the Z-axis direction of crystal orientation (i.e., a Z-cut substrate) is used, a change in refraction factor attributable to the electric field in the direction Z is utilized. Hence, an electrode (an electrode for applying an electric field to the optical waveguide in order to control the phase of the light propagating through the optical waveguide) is provided immediately above the waveguide.

Specifically, in the intensity modulator 1-1, an intensity modulation signal electrode (hot electrode) 11 is patterned on the parallel waveguide 4B, and an earth electrode (ground electrode) 12 is patterned on the parallel waveguide 4A. Thereby, the signal electrode 11 which is arrange to partially overlap one (4B) of the parallel waveguides 4A, 4B in the intensity modulator 1-1, and the ground electrode 12 which is arranged to partially overlap the remaining one (4A) of the parallel waveguides 4A, 4B are formed on the substrate 1. Reference numeral 13 also designates a ground electrode.

In the phase modulator 1-2, a signal electrode 15 is patterned on the optical waveguide 6. Further, ground electrodes 16, 17 are patterned in parallel to each other such that the signal electrode 15 is interposed therebetween. As a result, the signal electrode 15 which is arranged to partially overlap the optical waveguide 6 in the phase modulator 1-2 is formed on the substrate 1.

More specifically, the set of phase modulation electrodes (electrode sections) 15, 16, and 17 comprises a linear electrode section (a first electrode section) 21 extending linearly in the longitudinal direction of the substrate 1; a curved (bent) electrode section 22 whose one end is in mutual communication with the linear electrode section 21 and which assumes a semicircularly-bent folded geometry; and a linear electrode section (a second electrode section) 22 whose remaining end is in mutual communication with the curved electrode section 22 and which linearly extends in the longitudinal direction of the substrate 1.

The optical waveguide 6 comprises respective waveguide sections 61 to 67 provided below: namely, (1) the linear waveguide section 61 which linearly extends in the longitudinal direction of the substrate 1 along an area under the signal electrode 15 of the linear electrode section 21;

(2) the curved waveguide section 62 which is in mutual communication with the linear waveguide section 61 and assumes a semicircularly-curved geometry along the area under the signal electrode 15 of the curved electrode section 22;

(3) the linear waveguide section 63 which is mutual communication with the curved waveguide section 62 and linearly extends along the area under the signal electrode 15 of the linear electrode section 23 in the longitudinal direction of the substrate 1;

(4) the curved waveguide section 64 which is in mutual communication with the linear waveguide section 63 and assumes a semicircularly-curved geometry;

(5) the linear waveguide section 65 which is in mutual communication with the curved waveguide section 64 and extends in parallel to the linear waveguide section 63 in the longitudinal direction of the substrate 1, and a part of which (see reference numeral 65a) is provided along an area under the ground electrode 17;

(6) the curved waveguide section 66 which is in mutual communication with the linear waveguide section 65, assumes a semicircularly-curved geometry along the curved electrode section 22 of the one (inner) ground electrode 17, and is smaller in radius of curvature than the curved waveguide section 62; and (7) the linear waveguide section 67 which is in mutual communication with the curved waveguide section 66 and which extends along the area under the linear electrode section 23 of the ground electrode 17 in parallel (linearly) between the linear waveguide section 63 and the linear waveguide section 65 and in the longitudinal direction of the substrate 1.

After having passed through the area under the signal electrode 15, the optical waveguide 6 passes through the area under one (inner) ground electrode 17 of the respective ground electrodes 16, 17, thereby passing through the area under the signal electrode 15 and the area under the inner ground electrode 17, in this sequence. Put another way, the optical waveguide section 6 is formed so as to pass through either a location where the light passing through the optical waveguide is exposed to an electric field emitted from the signal electrode (an electric field emission electrode) 15 of the set of electrodes 15, 17 or a location where the light passing through the optical waveguide is exposed to the electric field converging at the ground electrode (an electric field convergence electrode) 17 of the set of electrodes 15, 17, and to pass through the remaining location. To this end, the optical waveguide 6 assumes a geometry, wherein the waveguide is folded a plurality of times (three times in FIG. 1) by the curved waveguide sections 62, 64, and 66 in the longitudinal direction of the substrate 1 and runs around (making two laps) over the substrate 1.

In addition, the optical waveguide 6 comprises the waveguide sections (first optical waveguide sections) 61, 62, and 63 which extend along the area under the signal electrode 15 in the respective electrodes 21, 22, and 23; and a waveguide section (a second optical waveguide section) 65a which is in mutual communication with the waveguide sections 61, 62, and 63 and extends along the area under the ground electrode 17 in the respective electrode sections 21, 22, and 23. Consequently, the interaction area in the phase modulator 1-2 corresponds to the waveguide sections 61, 62, 63, and 65a of the entire length of the optical waveguide 6.

In the present embodiment, the optical waveguide 6 is folded at the curved waveguide sections 64, 66, and hence there exists a point of intersection where the linear waveguide section 63 passing through the signal electrode 15 and the linear waveguide section 67 passing through the ground electrode 17 cross each other. These intersecting portions of the linear waveguides can also be connected together by use of an optical fiber. Since the intersection of these portions is a connection within a chip, a cross coupler (a cross waveguide section) 68 is applied to the intersecting portions. This cross coupler 68 has the function of guiding, to the curved waveguide section 64, all of the light beams having propagated through the linear waveguide section 63 located in the area under the signal electrode 15 as well as the function of guiding all of the light beams that have propagated through the linear waveguide section 67 located in the area under the ground electrode 17. For instance, an MMI (Multi-Mode Interference) coupler can be applied to the cross coupler 68, and the essential requirement is to set the length of the cross coupler to a length at which two input light beams are output from cross ports without causing interference.

By means of etching or the like, a groove section 8 is provided in the area of the substrate 1 outside the curved waveguide section 64, along the outer edge thereof. The effect for confining light in the curved waveguide section 64 is heightened by the groove section 8, thereby reducing a loss caused by light leaked (emitted) from the curved waveguide section 64.

Even in the present embodiment, in order to prevent the signal electrodes 11, 15 and the ground electrodes 12, 17 from absorbing the light propagating through the waveguides 4A, 4B, and 6, a dielectric layer (buffer layer) 30 (see FIG. 2) is interposed between the signal electrodes 11, 15, the ground electrodes 12, 17 and the substrate 1. Even in this case, $SiO_2$ having a thickness of, e.g., 0.2 to 1.0 μm can be used as the buffer layer 30. The electrodes 11, 12, 13, 15, 16, 17 and the buffer layer 30 can be formed by forming optical waveguides through thermal diffusion and proton exchange as mentioned previously and then subjecting the substrate to, e.g., dry etching.

In consideration of propagation speed of the microwave and a characteristic impedance, the area where light and electricity interact with each other preferably assumes a constant cross-sectional profile. Therefore, as mentioned above, when the curved waveguide sections 62, 66 are included in the interaction area, a groove section 31 (see FIG. 2) is formed over the entire interaction area by means of etching. Namely, the groove section 31 is preferably formed in the substrate 1 on both sides of the optical waveguides 4A, 4B, and 6 situated in areas under one side or both sides of the signal electrodes 11, 15 and the ground electrodes 12, 16, and 17, thereby providing a constant cross-sectional profile. As a result, reflection of the microwave, which would otherwise be caused by discontinuous impedance, is prevented. Moreover, the optical modulator can be operated at a high frequency by causing the speed of light to coincide with that of the microwave.

By means of the above-described configuration, the light having entered the incoming waveguide 2 undergoes intensity modulation in the intensity modulator 1-1 and then enters the optical waveguide 6 of the phase modulator 1-2. The light then propagates through the optical waveguide 6 along the geometry of the optical waveguide 6.

Specifically, the incoming light first propagates through the linear waveguide section 61, the curved waveguide section 62, and the linear waveguide section 63, all of which are located in the area under the signal electrode 15, and is guided to a cross port (the curved waveguide section 64) by means of a cross coupler 68. Next, the incoming light propagates from the curved waveguide section 64 to the linear waveguide section 65 and the linear waveguide section 65a located in the area under the ground electrode 17. Subsequently, the light is guided through the area under the ground electrode 17 to the outgoing waveguide 7 by means of the cross coupler 68 by way of the curved waveguide section 66 and the linear waveguide section 67.

As mentioned above, the light having passed through the intensity modulator 1-1 passes through the area under the ground electrode 17 of the phase modulator 1-2 after having passed through the area under the signal electrode 15 of the phase modulator 1-2. At this time, the intensity modulator 1-1 and the phase modulator 1-2 are activated at the same frequency f0 (a microwave having a frequency f0 is applied to the signal electrodes 11, 15), whereby a comb waveform having a frequency interval of f0 is output from the outgoing waveguide 7, as mentioned previously. The signal frequency f0 applied to the signal electrode 15 is set to 12.5 GHz or an integral multiple of a frequency close thereto, so that the optical frequency comb generator can be used as a multiwavelength light source for use in WDM light transmission.

In this case, the light having been input from the intensity modulator 1-1 passes through the phase modulator 1-2 twice in the same direction through areas under the signal electrode 15 and the ground electrode 17. For this reason, the length of one lap (from the starting point of the optical waveguide 6 located in the area under the signal electrode 15 to the starting point of the optical waveguide 6 located in the area under the ground electrode 17) of the waveguide must be adjusted in advance, in accordance with the wavelength of the microwave applied to the signal electrode 15 such that the orientation of modulation performed the first time becomes equal to that performed the second time.

As shown in FIG. 2, the electric field emitted by the microwave propagating through the signal electrode 15 converges at the ground electrodes 16, 17 adjacently located on the sides of the electrode 15. At this time, the electric field developing from the area under the signal electrode 15 and the electric field developing from the area under the ground electrode 17 are oriented in opposing directions. If the microwave developing from the starting point of the signal electrode 15 of the phase modulator 1-2 is not offset from the phase of the microwave developing from the starting point of the ground electrode 17 by π, modulation efficiency will be deteriorated. For instance, the lengths of the waveguides are set (designed) such that the length of the optical waveguide 6 from the starting point of the signal electrode 15 of the phase modulator 1-2 to the starting point of the ground electrode 17 comes to (N+½) times (N is an integer) the wavelength of the microwave (i.e., the wavelength acquired in the interaction area). The electric field developing from the area under the ground electrode 17 [or 16 (the same applies to any counterparts in the following description)] is likely to concentrate on the end of the ground electrode 17 facing the signal electrode 15. Therefore, the optical waveguide 6 passing through the area under the ground electrode 17 is preferably formed so as to be located much closer to the end of the ground electrode 17 facing the signal electrode 15 as shown in FIG. 2. In this respect, the same also applies to subsequent embodiments or modifications.

As a result, the phase modulator 1-2 of the present embodiment can effectively utilize, for optical phase modulation, the electric field emitted from the neighborhood of the signal electrode 15 and the electric field converging to the neighborhood of the ground electrode 17. Even when the length of the waveguide (the interaction length) is increased, the modulation index is increased by use of the electric field developing from the area under the ground electrode 17, thereby acquiring (increasing) a modulation index by the amount appropriate to the increase. Consequently, it becomes possible to increase the number of output wavelengths of the multiwavelength light source, to narrow the pulse width of the pulse light source, or to reduce the drive voltage (half wavelength voltage Vπ) for the multiwavelength light source and the pulse light source. Specifically, as shown in FIG. 2, the intensity Eg of the electric field developing from the area under the ground electrode 17 (16) is about one-fourth the intensity Es of the electric field developing from the area under the signal electrode 15. Hence, provided that the half wavelength voltage is Vπ, the voltage can be diminished by about 20% when compared with the half wavelength voltage in the conventional optical modulator.

In order to enhance the efficiency of application of the electric field to the optical waveguide 6 located in the area under the ground electrode 17, narrowing the width of the ground electrode 17 is desirable. For instance, a resultant effect is acquired by narrowing the width of the ground electrode 17 to 20 μm or less.

Figure 3:
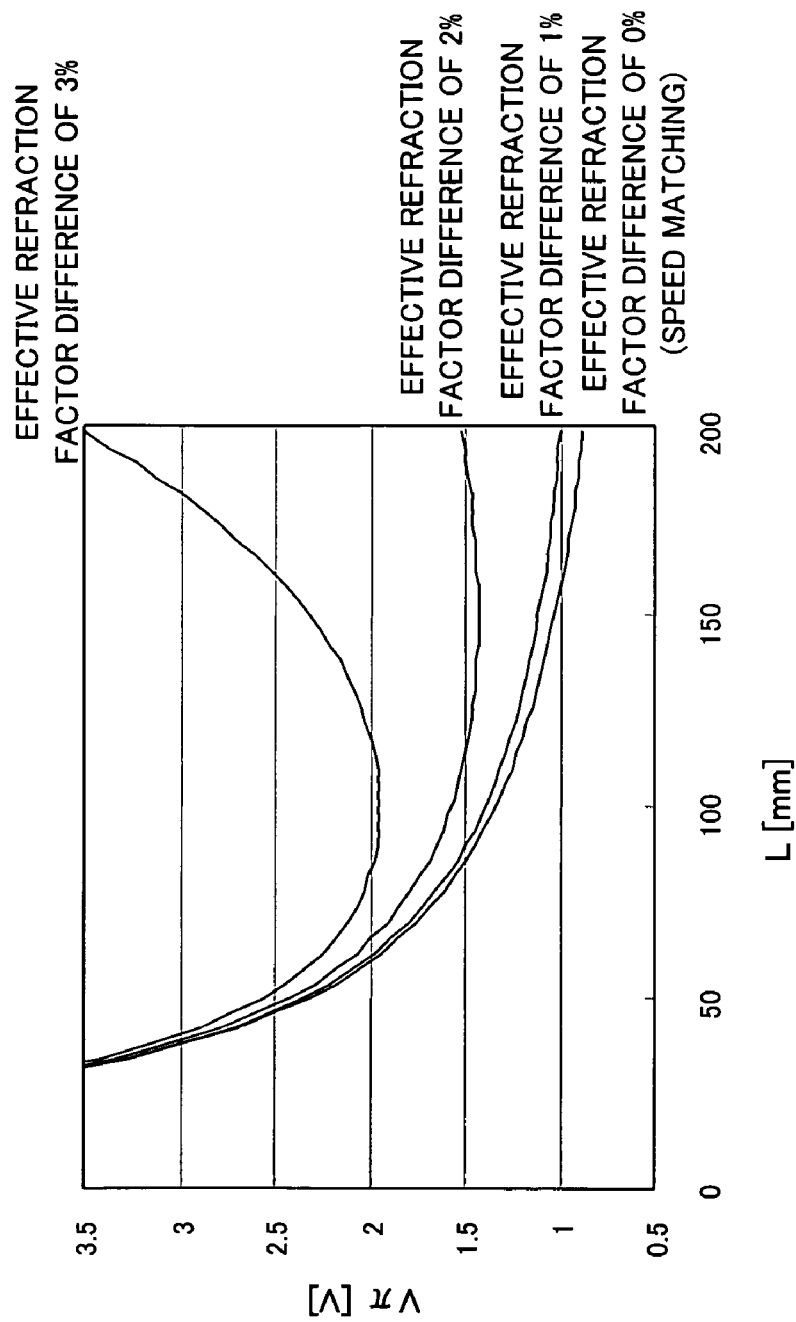
FIG. 3 is a view showing dependency of a half wavelength voltage on the length of an electrode according to the embodiment.

Moreover, when the interaction length is lengthened by increasing the length of the electrode constituting the phase modulator 1-2 as mentioned previously, a request for a match between the speed of the microwave and that of light becomes rigorous. FIG. 3 shows dependency of the half wavelength voltage Vπ on the length of the electrode. The length of the electrode is designed within, e.g., a range of 50 to 150 mm. However, as shown in FIG. 3, it is experimentally known that, when a difference of effective refraction factor between the optical waveguide 6 and the electrodes 15, 16, 17 has exceeded 2%, the half wavelength voltage Vπ increases sharply. Therefore, it is desirable to design the electrodes 15, 16, and 17 such that the difference in effective refraction factor falls within a range of ±2% (ideally 0%). The effective refraction factor is determined (can be controlled) by the cross-sectional profiles of the electrodes (e.g., the distance between the electrodes, the thickness of the electrodes, the depth of the groove, or the like).

In the previously-described embodiment, the curved waveguide sections 62, 64, and 66 are applied to the folds (folded waveguide sections) of the optical waveguide 6. However, for example, reflection of the propagating light can be realized by applying to one side (end face) of the substrate 1 a mirror which reflects the light output from the first optical waveguide section to the second optical waveguide section.

(A1) First Modification of the First Embodiment

In the previously-described embodiment, the optical waveguide 6 is formed so as to pass through the area under the ground electrode 17 close to the phase modulator 1-2 without passing through the area under the ground electrode 12 close to the intensity modulator 1-1. However, in a case where the drive voltage applied to the signal electrode 11 of the intensity modulator 1-1 is large or a like case, the optical waveguide 6 may be formed so as to pass through the area under the ground electrode 12 close to the intensity modulator 1-1 as shown in, e.g., FIG. 4, as well. Specifically, in this case, the interaction area in the phase modulator 1-2 corresponds to the waveguide sections 61, 62, 63, 65, and 65a of the entire length of the optical waveguide 6.

Figure 4:
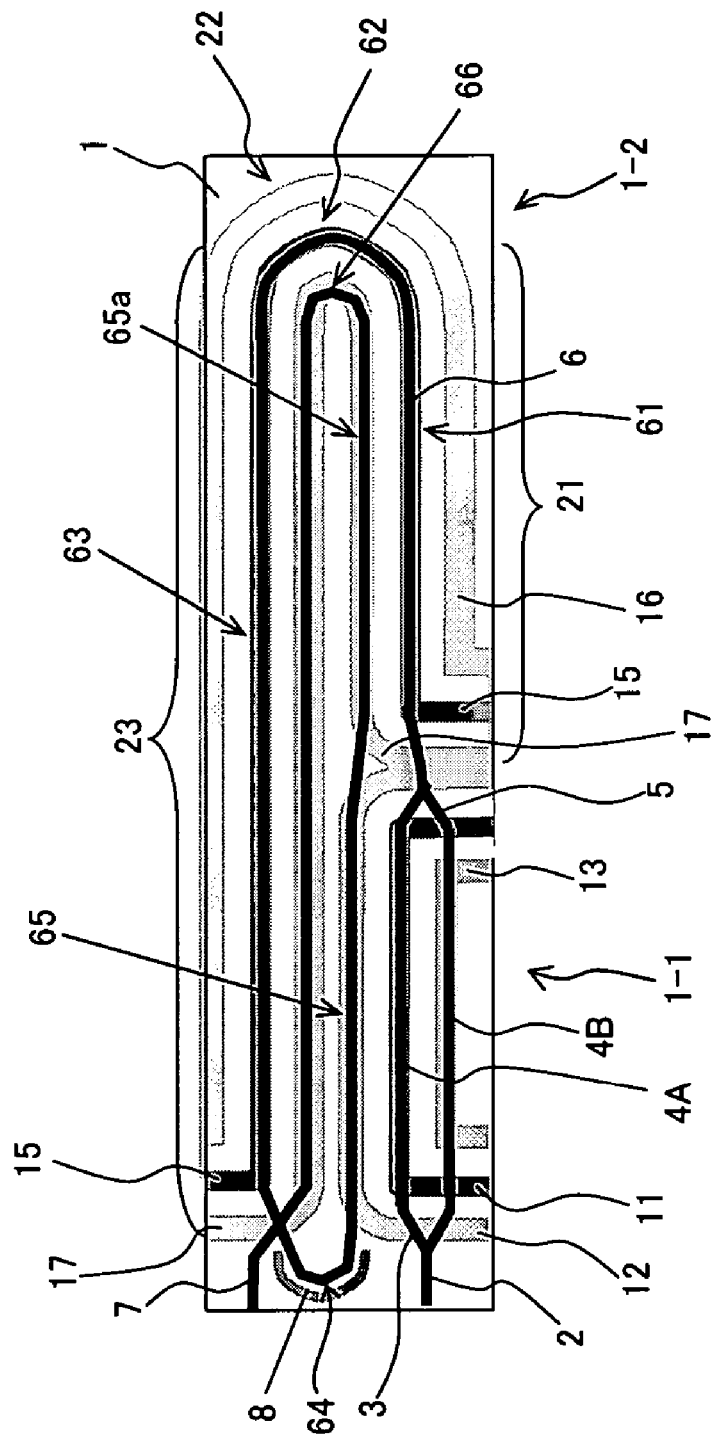
FIG. 4 is a schematic plan view showing the configuration of an optical modulator (an optical frequency comb generator) employed as an optical device according to a first modification of the first embodiment.

In FIG. 4, those elements which are assigned the same reference numerals as those elements which have already been described are identical or analogous to the same. In this case, the signal electrode 11 is formed on one (4A) of the parallel waveguides 4A, 4B, and the ground electrode 13 is formed on the remaining one (4B) of the parallel waveguides 4A, 4B.

By means of such a configuration, the modulation index can be increased further by utilization of the intensity modulation electric field developing from the area under the ground electrode 12 of the intensity modulator 1-1 as well as the phase modulation electric fields developing from the areas under the respective electrodes 15, 17 of the phase modulator 1-2. Therefore, the number of wavelengths output from the multiwavelength light source can be increased further, or the pulse width of the pulse light source can be narrowed further. Alternatively, the drive voltage (the half wavelength voltage Vπ) for these light sources can be reduced still further.

In the above-described embodiment and the first modification, the optical waveguide 6 passes solely through the area under the ground electrode 17 close to the phase modulator 1-2 or the area under the ground electrode 12 close to the intensity modulator 1-1 and the area under the ground electrode 17 close to the phase modulator 1-2. However, for example, the optical waveguide 6 may be formed so as to pass through only the ground electrode 12 close to the intensity modulator 1-1.

(A2) Second Modification of First Embodiment

Figure 5:
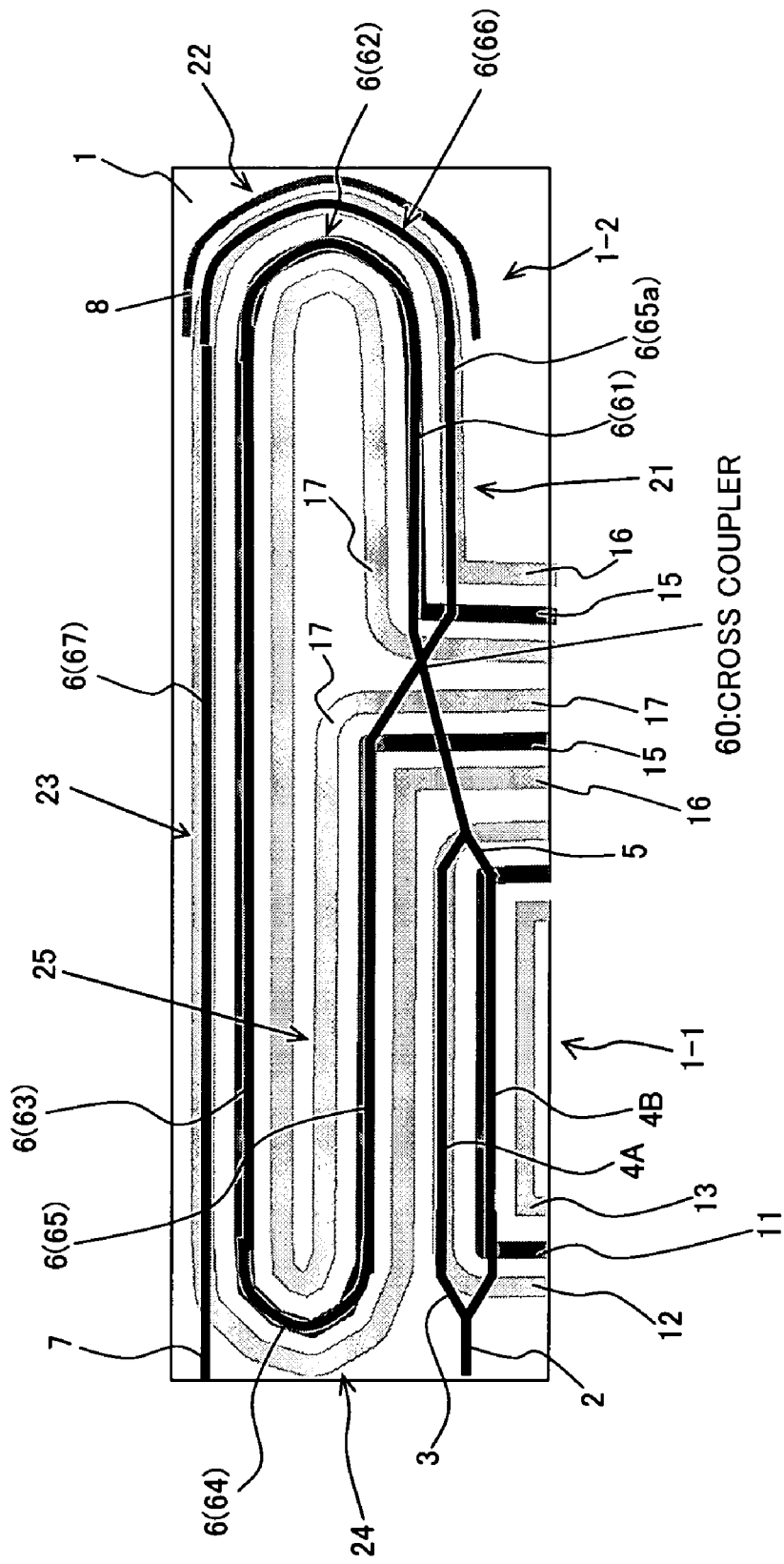
FIG. 5 is a schematic plan view showing the configuration of an optical modulator (an optical frequency comb generator) employed as an optical device according to a second modification of the first embodiment.

FIG. 5 is a schematic plan view showing a second modification of the optical device (the optical frequency comb generator) shown in FIG. 1. The optical frequency comb generator shown in FIG. 5 is basically different from that shown in FIG. 1 in the following points. Namely, the electrodes 15, 16, and 17 constituting the phase modulator 1-2 are folded at two locations (see reference numerals 22, 24) in the vicinity of the respective longitudinal ends of the substrate 1. Further, the phase modulation optical waveguide 6 is formed so as to pass through the outer area under the ground electrode 16 along the same after having passed through the area under the signal electrode 15 along the same.

More specifically, each of the electrodes (or the set of electrodes) 15, 16, and 17 comprises the linear electrode section (the first electrode section) 21 extending linearly in the longitudinal direction of the substrate 1; the curved (first bent) electrode section 22 whose one end is in mutual communication with the linear electrode section 21 and which assumes a semicircularly-bent geometry; the linear electrode section (the second electrode section) 23 which is in mutual communication with the remaining end of the curved electrode section 22 and which extends linearly in the longitudinal direction of the substrate 1; a curved (a second bent) electrode section 24 which is in mutual communication with the linear electrode section 23 and assumes a semicircularly-bent geometry; and a linear electrode section (a third electrode section) 25 which is in mutual communication with the curved electrode section 24 and extends linearly in the longitudinal direction of the substrate 1.

The optical waveguide 6 comprises the respective waveguide sections 61 to 67 provided below: namely, (1) the linear waveguide section 61 which is in mutual communication with the outgoing Y-branched waveguide 5 of the intensity modulator 1-1 by way of the cross coupler 60 and which extends linearly in the longitudinal direction of the substrate 1 along an area under the signal electrode 15 of the linear electrode section 21;

(2) the curved waveguide section 62 which is in mutual communication with the linear waveguide section 61 and assumes a semicircularly-curved geometry along the area under the signal electrode 15 of the curved electrode section 22;

(3) the linear waveguide section 63 which is in mutual communication with the curved waveguide section 62 and extends linearly along the area under the signal electrode 15 of the linear electrode section 23 in the longitudinal direction of the substrate 1;

(4) the curved waveguide section 64 which is in mutual communication with the linear waveguide section 63, assumes a semicircularly-curved geometry along the area under the signal electrode 15 of the curved electrode section 24, and is smaller than the curved waveguide section 62 in terms of radius of curvature;

(5) the linear waveguide section 65 which is in mutual communication with the curved waveguide section 64 and extends linearly along the area under the signal electrode 15 of the linear electrode section 25 in the longitudinal direction of the substrate 1;

(6) the linear waveguide section 65a which is in mutual communication with the linear waveguide section 65 by way of the cross coupler 60 and which extends linearly along the area under the ground electrode 16 outside of the linear electrode section 21 in the longitudinal direction of the substrate 1;

(7) the curved waveguide section 66 which is in mutual communication with the linear waveguide section 65a, assumes a semicircularly-curved geometry along the area under the ground electrode 16 of the curved electrode section 22, and is larger in radius of curvature than the curved waveguide section 62; and (8) the linear waveguide section 67 (the other end of the linear waveguide section 67 acts as the outgoing waveguide 7) which is in mutual communication with the curved waveguide section 66 and which extends along the area under the ground electrode 16 of the linear electrode section 23 in the longitudinal direction of the substrate 1.

After having passed through the area under the signal electrode 15, the optical waveguide 6 of the embodiment passes through the area under one (outer) ground electrode (16) of the respective ground electrodes 16, 17, thereby passing through the area under the signal electrode 15 and the area under the outer ground electrode 16, in this sequence. Put another way, the optical waveguide 6 is formed so as to pass through both a location where the light passing through the optical waveguide is exposed to an electric field emitted from the signal electrode 15 of the set of electrodes 15, 16 and a location where the light passing through the optical waveguide is exposed to the electric field which converges at the ground electrode 16 of the set of electrodes 15, 16. To this end, the optical waveguide 6 assumes a geometry, wherein the waveguide is folded a plurality of times (three times in FIG. 5) by the curved waveguide sections 62, 64, and 66 in the longitudinal direction of the substrate 1 and runs around (two laps) over the substrate 1 from the inner side to the outer side.

Moreover, the optical waveguide 6 of the present embodiment comprises the respective waveguide sections 61, 62, 63, 64, 65, 66, and 67. The respective waveguide sections 61, 62, 63, 64, and 65 function as the first optical waveguide sections which extend along the area under the signal electrode 15 of the respective electrode sections 21, 22, 23, 24, and 25. The respective waveguide sections 65a, 66, and 67 function as the second optical waveguide section which is in mutual communication with the first optical waveguide sections 61, 62, 63, 64, and 65 and extend along the area under the ground electrode 17 of the respective electrode sections 21, 22, 23, 24, and 25. Therefore, in the case of the present embodiment, the interaction area of the phase modulator 1-2 corresponds to the waveguide sections 61, 62, 63, 65, 65a, 66, and 67 of the entire length of the optical waveguide section 6.

The cross coupler (cross waveguide section) 60 has the function of guiding, to the optical waveguide (the waveguide section 61) 6 located in the area under the signal electrode 15 of the phase modulator 1-2), all of the light beams input from the outgoing Y-branched waveguide 5 of the intensity modulator 1-1, as well as having the function of guiding all of the light beams input by way of the optical waveguide 6 (the waveguide sections 61, 62, 63, 64, and 65) located in the area under the signal electrode 15 to the optical waveguide 6 (the waveguide section 65a) located in the area under the ground electrode 16. Even in this modification, the MMI coupler can be applied to the cross coupler 60, and the essential requirement is to set the cross coupler to a coupler length at which two input light beams are output from cross ports without causing interference.

Even in this embodiment, the groove section 8 is provided in the area of the substrate 1 outside the curved waveguide section 66 along the outer edge thereof, by means of etching or the like. The effect for confining light in the curved waveguide section 66 is heightened by the groove section 8, thereby reducing a loss caused by light leaked (emitted) from the curved waveguide section 66.

By means of the above-described configuration, the light input to the incoming waveguide 2 enters the optical waveguide 6 of the phase modulator 1-2 by way of the cross coupler 60 after having been subjected to modulation of intensity in the intensity modulator 1-1 and propagates through the optical waveguide 6 along the geometry of the optical waveguide 6.

Specifically, the incoming light first propagates through the linear waveguide section 61, the curved waveguide section 62, the linear waveguide section 63, the curved waveguide section 64, and the linear waveguide section 65, all of which are located in the area under the signal electrode 15, and is guided to the cross port (the linear waveguide section 65a located in the area under the ground electrode 16) by means of the cross coupler 60. Next, the incoming light propagates from the linear waveguide section 65a to the curved waveguide section 66 and the linear waveguide section 67 and is guided to the outgoing waveguide 7.

As mentioned above, the light having passed through the intensity modulator 1-1 passes through the area under the ground electrode 16 outside the phase modulator 1-2 after having passed through the area under the signal electrode 15 of the phase modulator 1-2. In this case, even in the present embodiment, the intensity modulator 1-1 and the phase modulator 1-2 are activated at the same frequency f0 (a microwave having a frequency f0 is applied to the signal electrodes 11, 15), whereby a comb waveform having a frequency interval of f0 is output from the outgoing waveguide 7.

Even in this case, the light from the intensity modulator 1-1 passes through the phase modulator 1-2 twice in the same direction through areas under the signal electrode 15 and the ground electrode 16. For this reason, the length of one lap (from the starting point of the optical waveguide 6 located in the area under the signal electrode 15 to the starting point of the optical waveguide 6 located in the area under the ground electrode 16) of the waveguide must be adjusted in advance, in accordance with the wavelength of the microwave applied to the signal electrode 15, such that the orientation of modulation performed the first time becomes equal to that performed the second time.

Specifically, as previously described by reference to FIG. 2, the electric field developing from the area under the signal electrode 15 and the electric field developing from the area under the ground electrode 16 are oriented in opposing directions. Hence, the lengths of the waveguides are set (designed) such that the length of the optical waveguide 6 from the starting point of the signal electrode 15 of the phase modulator 1-2 to the starting point of the ground electrode 16 comes to (N+½) times (N is an integer) the wavelength of the microwave (i.e., the wavelength acquired in the interaction area).

As a result, even in the present embodiment, the phase modulator 1-2 of the present embodiment can utilize, for optical phase modulation, the electric field emitted from the neighborhood of the signal electrode 15 and the electric field converging to the neighborhood of the ground electrode 16. Even when the length of the waveguide (the interaction length) is increased, the modulation index appropriate to the amount of increase can be acquired (increased) by increasing the modulation index through use of the electric field developing from the area under the ground electrode 16. Particularly, in the present embodiment, the electrodes 15, 16, and 17 of the phase modulator 1-2 are folded at two locations (the curved electrode sections 22, 24) in the vicinity of the longitudinal ends of the substrate 1. The optical waveguide 6 is formed so as to circulate in the areas under the signal electrode 15 and the ground electrode 16, so that a longer interaction length can be acquired.

Therefore, when compared with the configuration shown in FIGS. 1 and 2, it becomes possible to increase the modulation index while ensuring a longer interaction length, to further increase the number of output wavelengths of the multiwavelength light source, to further narrow the pulse width of the pulse light source, or to further reduce the drive voltage (half wavelength voltage V$\pi$) for the multiwavelength light source and the pulse light source. Moreover, a chip can be designed in a more compact manner.

Even in the present embodiment, in order to increase the efficiency of application of an electric field to the optical waveguide 6 located in the area under the ground electrode 16, narrowing the width of the ground electrode 16 is desirable. For instance, the effect can be yielded by narrowing the width of the ground electrode to 20 μm or less. Even in the present modification, as mentioned previously by reference to FIG. 3, it is experimentally known that, when a difference in effective refraction factor between the optical waveguide 6 and the electrodes 15, 16, and 17 has exceeded 2%, the half wavelength voltage V$\pi$ increases sharply. Hence, the electrodes 15, 16, and 17 are preferably designed such that the difference in effective refraction factor falls within a range of ±2%. Therefore, even in this modification, reflection of the propagating light, for instance, can be realized by applying, to one side (end face) of the substrate 1, a mirror which reflects the light output from the first optical waveguide section to the second optical waveguide section rather than applying the curved waveguide sections 62, 64, and 66 to the folds of the optical waveguide 6.

[B] Description of a Second Embodiment

Figure 6:
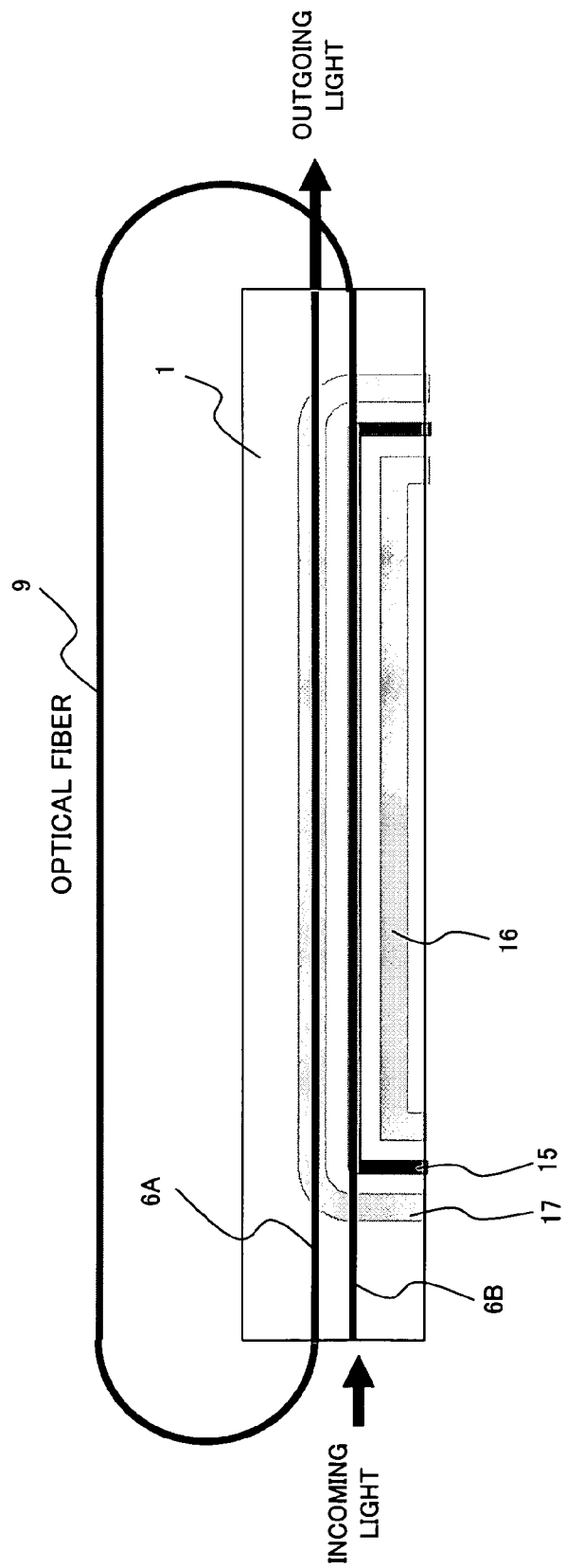
FIG. 6 is a schematic plan view showing the configuration of an optical modulator (a phase modulator) employed as an optical device according to a second embodiment of the present invention.

FIG. 6 is a schematic plan view showing the configuration of an optical modulator (a phase modulator) serving as an optical device according to a second embodiment of the present invention. In the phase modulator shown in FIG. 6, two parallel or essentially-parallel phase modulation waveguides (parallel waveguides) 6A, 6B are patterned on the substrate 1 having an electro-optical effect, such as an LN crystal or an LT crystal. The signal electrode (hot electrode) 15 is patterned on one (6B) of the parallel waveguides 6A, 6B. The earth electrodes (ground electrodes) 16, 17 parallel to the signal electrode 15 are patterned such that the signal electrode 15 is sandwiched therebetween. At this time, the earth electrode (ground electrode) 17 is patterned on the remaining one (6A) of the parallel waveguides 6A, 6B.

As a result, the signal electrode 15 which is arranged to partially overlap one (6B) of the parallel waveguides 6A, 6B and the ground electrode 17 which is arranged to partially overlap the remaining one (6A) of the parallel waveguides 6A, 6B are provided on the substrate 1.

Even in the present embodiment, the parallel waveguides 6A, 6B are formed by forming a metal film in some areas of the substrate 1 and thermally diffusing the thus-formed metal film or subjecting the metal film to proton exchange in a benzoic acid. When the substrate 1 which is cut in the Z-axis direction of crystal orientation (i.e., a Z-cut substrate) is used, a change in refraction factor attributable to the electric field in the direction Z is utilized. Hence, an electrode is provided immediately above the waveguide.

An output terminal of the parallel waveguide 6B located in the area under the signal electrode 15 is connected to an input terminal of the parallel waveguide 6A located in a area under the ground electrode 17 by means of the optical fiber 9. By means of this connection, the light having entered the parallel waveguide 6B passes through the parallel waveguide 6A by way of an optical fiber 9 after having passed through the parallel waveguide 6B and leaves the optical device.

Specifically, even in the present embodiment, the optical waveguide is formed so as to pass through the position where the optical waveguide undergoes the electric field emitted from the signal electrode 15 and the position where the optical waveguide undergoes the electric field which converges from the signal electrode 15 to the ground electrode 17; namely, the optical waveguide is formed so as to pass through the area under the ground electrode 17 by way of the optical fiber 9 after having passed through the area under the signal electrode 15.

As a result, even in the present embodiment, the light having entered the phase modulator propagates through the parallel waveguide 6B and enters the parallel waveguide 6A by way of the optical fiber 9 after having passed through the area under the signal electrode 15. The light further propagates through the parallel waveguide 6A in the same direction where the light propagates through the parallel waveguide 6B, to thus pass through the area under the ground electrode 17. At this time, even in the present embodiment, the incoming light passes through the phase modulator twice in the same direction by way of the area located under the signal electrode 15 and that located under the ground electrode 17. For this reason, the length of one lap (from the starting point of the waveguide 6B located in the area under the signal electrode 15 to the starting point of the optical waveguide 6A located in the area under the ground electrode 17) of the waveguide must be adjusted in advance, in accordance with the wavelength of the microwave applied to the signal electrode 15, such that the orientation of modulation performed the first time becomes equal to that performed the second time.

Specifically, as previously mentioned by reference to FIG. 2, the electric field developing from the area under the signal electrode 15 and the electric field developing from the area under the ground electrode 17 are oriented in opposing directions. The lengths of the waveguides are set (designed) such that the length of the waveguide from the starting point of the signal electrode 15 to the starting point of the ground electrode 17 (the parallel waveguides 6A, 6B and the optical fiber 9) come to (N+½) times the wavelength of the microwave (i.e., the wavelength acquired in the interaction area)

Even in the present embodiment, the phase modulator can utilize, for optical phase modulation, the electric field emitted from the vicinity of the signal electrode 15 and the electric field converging on the neighborhood of the ground electrode 17. Accordingly, even when the length of the waveguide (the interaction length) is increased, the modulation index is increased by use of the electric field developing from the area under the ground electrode 17, thereby acquiring (increasing) a modulation index by the amount appropriate to the increase.

Even in the present embodiment, in order to increase the efficiency of application of an electric field to the optical waveguide 6A located in the area under the ground electrode 17, narrowing the width of the ground electrode 17 is desirable. For instance, the effect can be yielded by narrowing the width of the ground electrode to 20 µm or less. Even in the present embodiment, as mentioned previously by reference to FIG. 3, it is experimentally known that, when a difference in effective refraction factor between the parallel waveguides 6A, 6B and the electrodes 15, 16, and 17 has exceeded 2%, the half wavelength voltage Vπ increases sharply. Therefore, it is desirable to design the electrodes 15, 16, and 17 such that the difference in effective refraction factor falls within a range of %.

(B1) First Modification of the Second Embodiment

Figure 7:
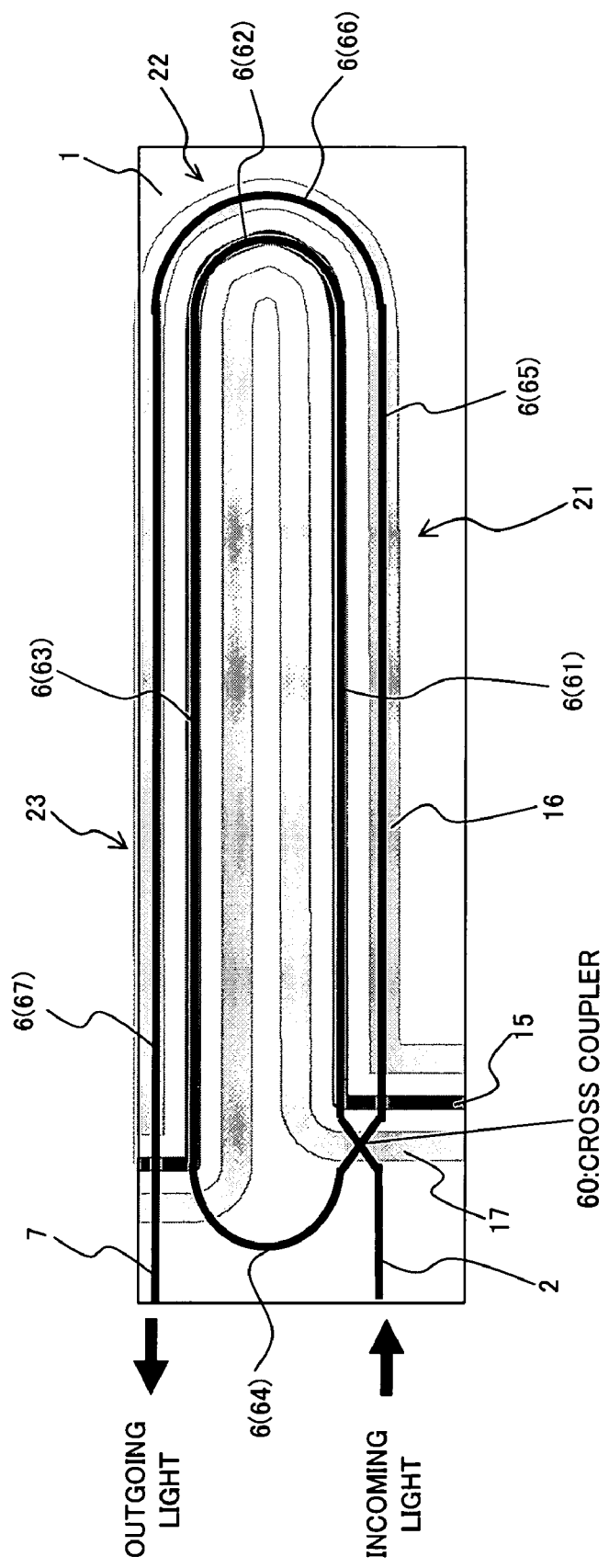
FIG. 7 is a schematic plan view showing the configuration of an optical modulator (a phase modulator) employed as an optical device according to a first modification of the second embodiment.

FIG. 7 is a schematic plan view showing the configuration of an optical modulator (phase modulator) serving as an optical device according to a first modification of the second embodiment. The phase modulator shown in FIG. 7 comprises the incoming waveguide 2 through which incoming light propagates and the optical waveguide 6, both being formed on the substrate 1 having an electro-optical effect, such as an LN crystal or an LT crystal. The optical waveguide 6 is a phase modulation waveguide which is in mutual communication with the incoming waveguide 2 by means of the cross coupler (cross waveguide section) 60 and forms an interaction area. In order to ensure as long interaction length as possible, the optical waveguide 6 has a three-folded geometry, wherein the optical waveguide is folded three times in the longitudinal direction of the substrate 1 at three folded sections (curved waveguide sections) as designated by reference numerals 62, 64, and 66. The other end of the optical waveguide 6 is formed as an outgoing waveguide 7.

Even in this case, the respective waveguides 2, 6 (7) and the cross coupler 60 are formed by forming a metal film in some areas of the substrate 1 and subjecting the film to thermal diffusion or by patterning a metal film and subjecting the patterned metal film to proton exchange in a benzoic acid. When the substrate 1 which is cut in the Z-axis direction of crystal orientation (i.e., a Z-cut substrate) is used, a change in refraction factor attributable to the electric field in the direction Z is utilized. Hence, an electrode is provided immediately above the waveguide.

Specifically, the signal electrode 15 is patterned on the optical waveguide 6. Further, the ground electrodes 16, 17 are patterned in parallel to each other such that the signal electrode 15 is interposed therebetween. As a result, the signal electrode 15 which is arranged to partially overlap the optical waveguide 6 is formed on the substrate 1.

More specifically, the phase modulation electrodes 15, 16, and 17 comprise the linear electrode section (the first electrode section) 21 extending linearly in the longitudinal direction of the substrate 1; the curved (bent) electrode section 22 whose one end is in mutual communication with the linear electrode section 21 and which assumes a semicircularly-curved folded geometry; and the linear electrode section (the second electrode section) 23 which is in mutual communication with the other end of the curved electrode section 22 and which extends linearly in the longitudinal direction of the substrate 1.

The optical waveguide 6 comprises the respective waveguide sections 61 to 67 provided below: namely, (1) the linear waveguide section 61 which is in mutual communication with the incoming waveguide 2 along the area under the signal electrode 15 of the linear electrode section 21 by way of the cross coupler 60 and which extends linearly in the longitudinal direction of the substrate 1;

(2) the curved waveguide section 62 which is in mutual communication with the linear waveguide section 61 and assumes a semicircularly-curved geometry along the area under the signal electrode 15 of the curved electrode section 22;

(3) the waveguide section 63 which is in mutual communication with the curved waveguide section 62 and extends linearly along the signal electrode 15 of the linear electrode section 23 in the longitudinal direction of the substrate 1;

(4) the curved waveguide section 64 which is in mutual communication with the linear waveguide section 63 and assumes a semicircularly-curved geometry;

(5) the linear waveguide section 65 which is in mutual communication with the curved waveguide section 64 by way of the cross coupler 60 and which extends linearly in the longitudinal direction of the substrate 1 along the area under the ground electrode 16;

(6) the curved waveguide section 66 which is in mutual communication with the linear waveguide section 65, assumes a semicircularly-curved geometry along the curved electrode section 22 of the outer ground electrode 16, and is larger in radius of curvature than the curved waveguide section 62; and (7) the linear waveguide section 67 which is in mutual communication with the curved waveguide section 66 and which linearly extends outside the linear waveguide section 63 along the ground electrode 16 of the linear electrode section 23 in the longitudinal direction of the substrate 1.

After having passed through the area under the signal electrode 15, the optical waveguide 6 of the present modification passes through the area under one (outer) ground electrode (16) of the respective ground electrodes 16, 17, thereby passing through the area under the signal electrode 15 and the area under the outer ground electrode 16, respectively. Put another way, the optical waveguide section 6 is formed so as to pass through both a location where the light passing through the optical waveguide is exposed to the electric field emitted from the signal electrode 15 of the set of electrodes 15, 16 and a location where the light passing through the optical waveguide is exposed to the electric field converging at the ground electrode 16 of the set of electrodes 15, 16, respectively. To this end, the optical waveguide 6 assumes a geometry, wherein the waveguide is folded a plurality of times (three times in FIG. 7) by the curved waveguide sections 62, 64, and 66 in the longitudinal direction of the substrate 1 and runs around (making two laps) over the substrate 1 from the inside to the outside.

In addition, the optical waveguide 6 comprises the waveguide sections (first optical waveguide sections) 61, 62, and 63 which extend along the area under the signal electrode 15 in the respective electrode sections 21, 22, and 23; and waveguide sections (second optical waveguide sections) 65, 66, and 67 which are in mutual communication with the first waveguide sections 61, 62, and 63 and extend along the area under the ground electrode 17 in the respective electrode sections 21, 22, and 23. Consequently, the interaction area in the phase modulator 1-2 corresponds to the waveguide sections 61, 62, 63, 64, 65, 66, and 67 of the entire length of the optical waveguide 6.

A point of intersection exists in the optical waveguide 6 at an area where the curved waveguide section 64 runs from the area under the signal electrode 15 to the ground electrode 16. These intersecting portions of the waveguide sections can also be connected together by use of an optical fiber. However, since the intersection of these portions is a connection within a chip, the cross coupler (the cross waveguide section) 60 is applied to the intersecting portions. This cross coupler 60 has the function of guiding all of the light beams having been input from the incoming waveguide 2 to the waveguide section 61 located in the area under the signal electrode 15, as well as having the function of guiding all of the light beams input from the curved waveguide section 64 to the waveguide section 65 located in the area under the ground electrode 16. Even in this case, for instance, an MMI (Multi-Mode Interference) coupler can be applied to the cross coupler 60, and the essential requirement is to set the length of the cross coupler to a length at which two input light beams are output from cross ports without causing interference.

A groove section may be provided in the area of the substrate 1 outside the curved waveguide section 64 along the outer edge thereof, by means of etching or the like. By means of this structure, the effect for confining light in the curved waveguide section 64 is heightened, thereby reducing a loss caused by light leaked (emitted) from the curved waveguide section 64.

Even in the present modification, in order to prevent the signal electrode 15 and the ground electrode 16 (17) from absorbing the light propagating through the optical waveguide 6, the dielectric layer (buffer layer) 30 (see FIG. 2) is interposed between the substrate 1, the signal electrode 15, and the ground electrode 16 (17). Even in this case, $SiO_2$ having a thickness of, e.g., 0.2 to 1.0 μm can be used as the buffer layer 30. The electrodes 15, 16, 17 and the buffer layer 30 can be formed by forming optical waveguides through thermal diffusion and proton exchange as mentioned previously and then subjecting the substrate to, e.g., dry etching.

In consideration of propagation speed of the microwave and a characteristic impedance, the area where light and electricity interact with each other preferably assumes a uniform cross-sectional profile. Therefore, as mentioned above, when the curved waveguide sections 62, 66 are included in the interaction area, the overall area is preferably subjected to etching, to thus assume a constant cross-sectional profile. As a result, reflection of the microwave, which would otherwise be caused by discontinuous impedance, is prevented. Moreover, the optical modulator can be operated at a high frequency by causing the speed of light to coincide with that of the microwave.

By means of the above-described configuration, the light having entered the incoming waveguide 2 enters the optical waveguide 6 located in the area under the signal electrode 15 by way of the cross coupler 60. The light then propagates through the optical waveguide 6 along the geometry of the optical waveguide 6.

Specifically, the incoming light first propagates through the linear waveguide section 61, the curved waveguide section 62, the linear waveguide section 63, and the curved waveguide section 64, all of which are located in the area under the signal electrode 15, and is guided to the linear waveguide section 65 located in the area under the ground electrode 16 which is in communication with the cross port by means of the cross coupler 60. Next, the incoming light exits the outgoing waveguide 7 through the area located under the ground electrode 16 by way of the linear waveguide section 65, the curved waveguide section 66, and the linear waveguide section 67.

As mentioned above, after having passed through the area under the signal electrode 15, the light entering the phase modulator passes through the area under the ground electrode 16. In this case, the light propagating through the optical waveguide 6 is subjected to phase modulation through application of the microwave to the signal electrode 15. Even in this case, the incoming light passes twice in the same direction through the area under the signal electrode 15 and that of the ground electrode 17. For this reason, the length of one lap (from the starting point of the optical waveguide 6 located in the area under the signal electrode 15 to the starting point of the optical waveguide 6 located in the area under the ground electrode 16) of the waveguide must be adjusted in advance, in accordance with the wavelength of the microwave applied to the signal electrode 15, such that the orientation of modulation performed the first time becomes equal to that performed the second time.

Specifically, as previously described by reference to FIG. 2, the electric field developing from the microwave propagating through the signal electrode 15 converges to the ground electrodes 16, 17 adjacent to both sides of the signal electrode 15. At this time, the electric field developing from the area under the signal electrode 15 and the electric field developing from the area under the ground electrode 16 (17) are oriented in opposite directions. Hence, the length of the waveguide is set (designed) such that the length of the optical waveguide 6 from the starting point of the signal electrode 15 to the starting point of the ground electrode 16 comes to (N+½) times the wavelength of the microwave (i.e., the wavelength acquired in the interaction area).

As a result, the phase modulator of the present modification can utilize, for optical phase modulation, the electric field emitted from the neighborhood of the signal electrode 15 and the electric field converging to the neighborhood of the ground electrode 16. For this reason, even when the length of the waveguide (the interaction length) is lengthened, the modulation index appropriate to the amount of increase can be acquired (increased) by increasing the modulation index through use of the electric field developing from the area under the ground electrode 16. The drive voltage (half wavelength voltage Vπ) can be reduced.

Even in the present modification, in order to increase the efficiency of application of an electric field to the optical waveguide 6 located in the area under the ground electrode 16, narrowing the width of the ground electrode 16 is desirable. For instance, the effect can be yielded by narrowing the width of the ground electrode to 20 μm or less.

Even in the present modification, as mentioned previously by reference to FIG. 3, it is experimentally known that, when a difference in effective refraction factor between the optical waveguide 6 and the electrodes 15, 16, and 17 has exceeded 2%, the half wavelength voltage Vπ increases sharply. Therefore, the electrodes 15, 16, and 17 are desirably designed such that the difference in effective refraction factor falls within the range of ±2%.

Therefore, even in this modification, reflection of the propagating light can be realized by applying, to one side (end face) of the substrate 1, a mirror which reflects the light output from the first optical waveguide section to the second optical waveguide section rather than applying the curved waveguide sections 62, 64, and 66 to the folds of the optical waveguide 6.

(B2) Second Modification of the Second Embodiment

Figure 8:
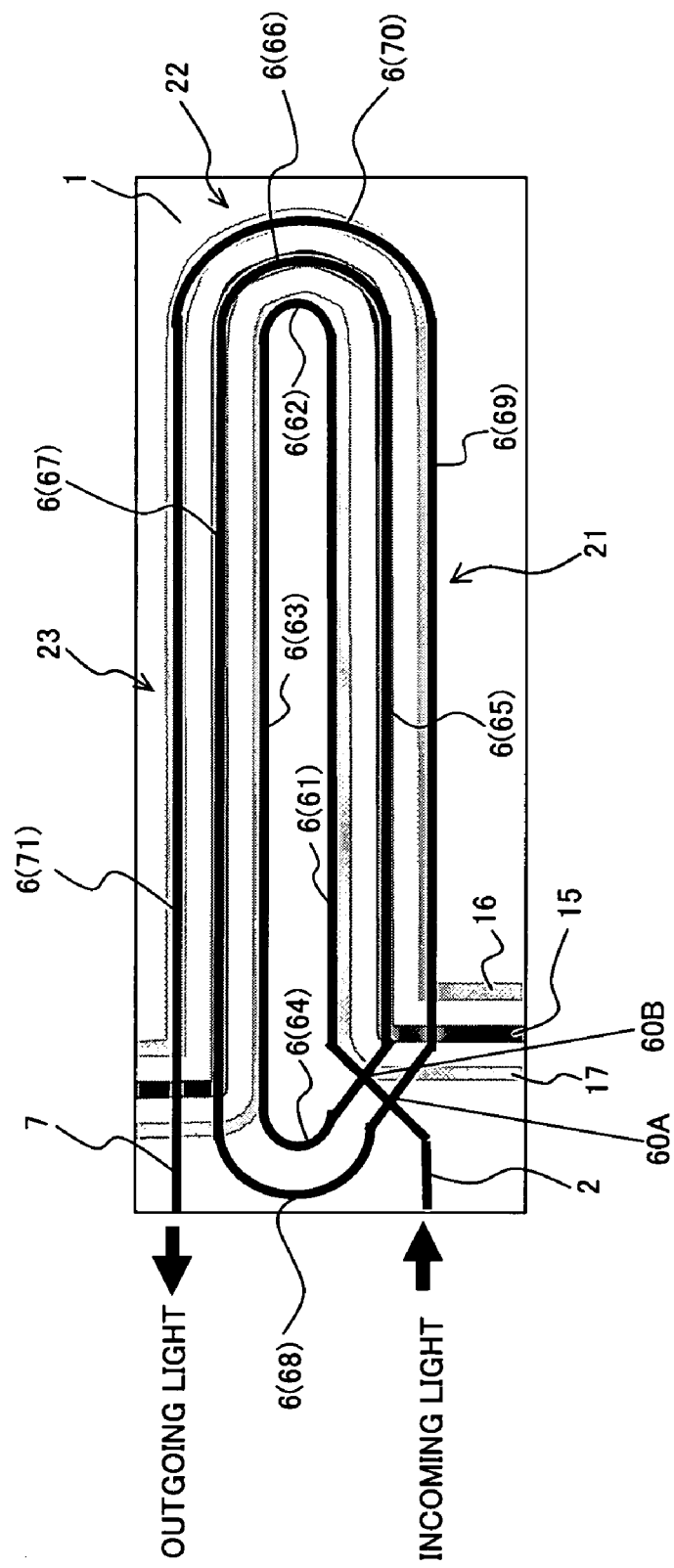
FIG. 8 is a schematic plan view showing the configuration of an optical modulator (a phase modulator) employed as an optical device according to a second modification of the second embodiment.

FIG. 8 is a schematic plan view showing the configuration of an optical modulator (phase modulator) serving as an optical device according to a second modification of the second embodiment. The phase modulator shown in FIG. 8 comprises the incoming waveguide 2 through which incoming light propagates and the optical waveguide 6, both being formed on the substrate 1 having an electro-optical effect, such as a $LiNbO_3$ (LN) crystal or a $LiTaO_2$ (LT) crystal. The optical waveguide 6 is a phase modulation waveguide which is in mutual communication with the incoming waveguide 2 by means of the cross coupler 60A and forms an interaction area. In order to ensure as long an interaction length as possible, the optical waveguide 6 has a five-folded geometry, wherein the optical waveguide is folded five times in the longitudinal direction of the substrate 1 at five folded sections (curved waveguide sections) as designated by reference numerals 62, 64, 66, 68, and 70. The other end of the optical waveguide 6 is formed as the outgoing waveguide 7.

Even in this case, the respective waveguides 2, 6 (7) are formed by forming a metal film in some areas of the substrate 1 and subjecting the film to thermal diffusion or by patterning a metal film and subjecting the patterned metal film to proton exchange in a benzoic acid. When the substrate 1 which is cut in the Z-axis direction of crystal orientation (i.e., a Z-cut substrate) is used, a change in refraction factor attributable to the electric field in the direction Z is utilized. Hence, an electrode is provided immediately above the optical waveguide 6.

Specifically, the signal electrode 15 is patterned on the optical waveguide 6. Further, the ground electrodes 16, 17 are patterned in parallel to each other such that the signal electrode 15 is interposed therebetween. As a result, the signal electrode 15 which is arranged to partially overlap the optical waveguide 6 is formed on the substrate 1.

More specifically, even in this case, the phase modulation electrode sections (the set of electrodes) 15, 16, and 17 comprise the linear electrode section (a first electrode section) 21 extending linearly in the longitudinal direction of the substrate 1; the curved (bent) electrode section 22 whose one end is in mutual communication with the linear electrode section 21 and which assumes a semicircularly-curved folded geometry; and the linear electrode section (a second electrode section) 23 which is in mutual communication with the other end of the curved electrode section 22 and which extends linearly in the longitudinal direction of the substrate 1.

The optical waveguide 6 comprises the respective waveguide sections 61 to 71 provided below: namely, (1) the linear waveguide section 61 which is in mutual communication with the incoming waveguide 2 by way of the cross coupler 60A along the area under the one (inner) ground electrode 17 (the linear electrode section 21) and which linearly extends in the longitudinal direction of the substrate 1;

(2) the curved waveguide section 62 which is in mutual communication with the linear waveguide section 61 and assumes a semicircularly-curved geometry along the area under the ground electrode 17 (the curved electrode section 22);

(3) the linear waveguide section 63 which is in mutual communication with the curved waveguide section 62 and extends linearly along the area under the ground electrode 17 (the linear electrode section 23) in the longitudinal direction of the substrate 1;

(4) the curved waveguide section 64 which is in mutual communication with the linear waveguide section 63 and which assumes a semicircularly-curved geometry;

(5) the linear waveguide section 65 which is in mutual communication with the curved waveguide section 64 by way of the cross coupler 60B and extends linearly along the area under the signal electrode 15 in the longitudinal direction of the substrate 1;

(6) the curved waveguide section 66 which is in mutual communication with the linear waveguide section 65, assumes a semicircularly-curved geometry along the area under the signal electrode 15 (the curved electrode section 22), and is larger in radius of curvature than the curved waveguide section 62;

(7) the linear waveguide section 67 which is in mutual communication with the curved waveguide section 66 and which extends linearly in the longitudinal direction of the substrate 1 outside the waveguide section 63 along the area under the signal electrode 15 (the linear electrode section 23);

(8) the curved waveguide section 68 which is in mutual communication with the linear waveguide section 67, assumes a semicircularly-curved geometry, and is larger in radius of curvature than the curved waveguide section 64;

(9) the linear waveguide section 69 which is in mutual communication with the curved waveguide section 68 by way of the cross coupler 60A and which extends linearly in the longitudinal direction of the substrate 1 outside the linear waveguide section 65 along the other ground electrode 16;

(10) the curved waveguide section 70 which is in mutual communication with the linear waveguide section 69 and assumes a semicircularly-curved geometry along the area under the ground electrode 16 (the curved electrode section 22); and

(11) the linear waveguide section 71 which is in mutual communication with the curved waveguide section 70 and extends linearly in the longitudinal direction of the substrate 1 outside the linear waveguide section 67 along the area under the ground electrode 16 of the linear electrode section 23.

After having passed through (run along) the area under one ground electrode 17, the optical waveguide 6 of the present embodiment passes through (runs along) the area under the signal electrode 15 and the area under the other ground electrode 16 as well, thereby passing through the area under the signal electrode 15 and the areas under the ground electrodes 16, 17, respectively. Put another way, the optical waveguide section 6 is formed so as to pass through both a location where the optical waveguide is exposed to the electric field emitted from the signal electrode 15 of the set of electrodes 15, 16 (17) and a location where the optical waveguide is exposed to the electric field converging at the ground electrode 16 (17) of the set of electrodes 15, 16 (17), respectively. To this end, the optical waveguide 6 assumes a geometry wherein the waveguide is folded a plurality of times (five times in FIG. 8) by the curved waveguide sections 62, 64, 66, 68, and 70 in the longitudinal direction of the substrate 1 and runs around (making three laps) over the substrate 1 from the inside to the outside.

In addition, the optical waveguide 6 comprises the first waveguide sections 61, 62, and 63 which extend along the area under the one ground electrode 17 in the respective electrode sections 21, 22, and 23; the second optical waveguide sections 65, 66, and 67 which are in mutual communication with the first waveguide sections 61, 62, and 63 and extend along the area under the signal electrode 15 in the respective electrode sections 21, 22, and 23; and the third optical waveguide sections 69, 70, and 71 which are in mutual communication with the second optical waveguide sections 65, 66, and 67 and which extend along the area under the other ground electrode 16 in the respective electrode sections 2, 22, and 23. Consequently, the interaction area in the phase modulator corresponds to the waveguide sections 61, 62, 63, 65, 66, 67, 69, 70, and 71 of the entire length of the optical waveguide 6.

A point of intersection exists in the optical waveguide 6 at an area where the optical waveguide 6 shifts from the area under the ground electrode 17 to the signal electrode 15 by way of the curved waveguide section 64 and at an area where the optical waveguide 6 shifts from the area under the signal electrode 15 to the ground electrode 16 by way of the curved waveguide section 68. These intersecting portions of the waveguide sections can also be connected together by use of an optical fiber. However, since the intersection of these portions is a connection within a chip, the cross coupler 60A is applied to the intersection between the first optical waveguide section and the second optical waveguide section, and the cross coupler 60B is applied to the intersection between the second optical waveguide section and the third optical waveguide section.

The cross coupler (first intersecting waveguide section) 60A has the function of guiding all of the light beams having been input from the incoming waveguide 2 to the linear waveguide section 61 located in the area under the ground electrode 17, as well as having the function of guiding all of the light beams input from the curved waveguide section 68 to the linear waveguide section 65 located in the area under the ground electrode 16. The cross coupler (second intersecting waveguide section) 60B has the function of guiding the light having entered by way of the cross coupler 60A to the linear waveguide section 61 located in the area under the ground electrode 17, as well has having the function of guiding all of the light beams input from the curved waveguide section 64 to the linear waveguide section 65 located in the area under the signal electrode 15. In any event, for instance, an MMI coupler can be applied to the cross couplers 60A, 60B, and the essential requirement is to set the lengths of the coupler to a length at which two input light beams are output from cross ports without causing interference.

A groove section may be provided in the area of the substrate 1 outside the curved waveguide sections 64, 68 along the outer edges thereof, by means of etching or the like. By means of this structure, the effect for confining light in the curved waveguide sections 64, 68 is heightened, thereby reducing a loss caused by light leaked (emitted) from the curved waveguide sections 64, 68.

Even in the present embodiment, in order to prevent the signal electrode 15 and the ground electrodes 16, 17 from absorbing the light propagating through the optical waveguide 6, the dielectric layer (buffer layer) 30 (see FIG. 2) is interposed between the signal electrode 15, the ground electrodes 16, 17 and the substrate 1. Even in this case, $SiO_2$ having a thickness of, e.g., 0.2 to 1.0 μm can be used as the buffer layer 30.

The electrodes 15, 16, 17 and the buffer layer 30 can be formed by forming optical waveguides through thermal diffusion or proton exchange as mentioned previously and then exposing the substrate to, e.g., dry etching.

In consideration of propagation speed of the microwave and a characteristic impedance, the area where light and electricity interact with each other preferably assumes a constant cross-sectional profile. Therefore, as mentioned above, when the curved waveguide sections 62, 66, and 70 are included in the interaction area, the entire area is preferably subjected to etching, to thus assume a constant cross-sectional profile. As a result, reflection of the microwave, which would otherwise be caused by discontinuous impedance, is prevented. Moreover, the optical modulator can be operated at a high frequency by causing the speed of light to coincide with that of the microwave.

By means of the above-described configuration, the light having been input to the incoming waveguide 2 enters the optical waveguide 6 located in the area under the ground electrode 17, by way of the cross coupler 60A. The light then propagates through the optical waveguide 6 along the geometry thereof.

Specifically, the incoming light first propagates through the linear waveguide section 61, the curved waveguide section 62, the linear waveguide section 63, and the curved waveguide section 64, all of which are located in the area under the ground electrode 17, and is guided to the linear waveguide section 65 located in the area under the signal electrode 15 which is in communication with the cross port by means of the cross coupler 60B. Next, the incoming light enters one input port of the cross coupler 60A by passing through the area located below the signal electrode 15 by way of the linear waveguide section 65, the curved waveguide section 66, the linear waveguide section 67, and the curved waveguide section 68.

The light having entered the cross coupler 60A is guided to the cross port thereof, thereby propagating through the linear waveguide section 69, the curved waveguide section 70, and the linear waveguide section 71 through the area located below the other ground electrode 16.

Specifically, after having passed through the area below the one ground electrode 17, the light entering the phase modulator passes through the area under the signal electrode 15 and further the area under the other ground electrode 16. In this case, as a result of the microwave having being applied to the signal electrode 15, the light propagating through the optical waveguide 6 is subjected to phase modulation. Even in this case, the incoming light passes three times in the same direction through the area under the signal electrode 15 and those of the ground electrodes 16, 17. For this reason, the length of one lap from the starting point of the optical waveguide 6 located below the ground electrode 17 to the starting point of the optical waveguide 6 located below the signal electrode 15 and the length of a lap from the starting point of the optical waveguide 6 located below the signal electrode 15 to the starting point of the optical waveguide 6 located below the ground electrode 16 must be adjusted in advance, in accordance with the wavelength of the microwave applied to the signal electrode 15, such that the orientation of modulation performed the first time becomes equal to that performed the second time and such that the orientation of modulation performed the second time becomes equal to that performed the third time.

As a result, the phase modulator of the present embodiment can utilize, for optical phase modulation, the electric field emitted from the neighborhood of the signal electrode 15 and the electric field converging to the neighborhoods of the ground electrodes 16, 17. Even when the length of the waveguide (the interaction length) is lengthened further, the modulation index appropriate to the amount of increase can be acquired (increased) by increasing the modulation index through use of the electric field developing from the area under the ground electrode 16. The drive voltage (half wavelength voltage Vπ) can be reduced (by about 30% as compared with the conventional phase modulator).

Even in the present embodiment, in order to increase the efficiency of application of an electric field to the optical waveguide 6 located below the ground electrodes 16, 17, narrowing the widths of the ground electrodes 16, 17 is desirable. For instance, the effect can be yielded by narrowing the width of the ground electrode to 20 μm or less.

Even in the present modification, as mentioned previously by reference to FIG. 3, it is experimentally known that, when a difference in effective refraction factor between the optical waveguide 6 and the electrodes 15, 16, and 17 exceeds 2%, the half wavelength voltage Vπ increases sharply. Therefore, the electrodes 15, 16, and 17 are desirably designed such that the difference in effective refraction factor falls within the range of ±2%.

Therefore, even in this modification, reflection of the propagating light can be realized by applying, to one side (end face) of the substrate 1, a mirror which reflects the light output from the first optical waveguide section to the second optical waveguide section rather than applying the curved waveguide sections 62, 64, 66, 68, and 70 to the folds of the optical waveguide 6.

The present invention is not limited to the previously-described embodiments and can be carried out while being modified in various forms without departing from the gist of the present invention.

For instance, the Z-cut substrate is adopted as the substrate 1 in the previously-described embodiment. However, even when an X-cut substrate is adopted, a working effect analogous to those yielded by the respective embodiments can be expected, so long as the waveguide is formed so as to pass a position where the waveguide is exposed to an electric field emitted from the signal electrode (the electric-field emission electrode) of the electrode section or another position where the waveguide is exposed to the electric field converging at the ground electrode (the electric-field convergence electrode) of the same electrode, and to subsequently pass through the remaining position.

In the above-described embodiment, the waveguide section (the electrode section) other than the folded portions (the curved waveguide sections 62, 64, 66, 68, and 70) is taken as the linear waveguide sections 61, 63, 65, 65a, 67, 69, and 71. However, the remaining portions are not necessarily linear. For instance, the remaining portions may assume a curved geometry, such as a wavy geometry or a zigzag geometry. In this case, a longer interaction length can be ensured.

What is claimed is:

1. An optical device comprising:
    a substrate having an electro-optical effect;
    an optical waveguide formed in said substrate; and
    an electrode section which has a signal electrode and a ground electrode for applying an electric field to said optical waveguide, wherein
    a part of said optical waveguide is formed on a position where said optical waveguide is under said signal electrode of said electrode section and another part of said optical waveguide is formed on a position where said optical waveguide is under said ground electrode of said electrode section, and
    a length of said optical waveguide from a position in which light is exposed to said electric field emitted from said signal electrode of said electrode section to a position in which said light is exposed to said electric field converging to said ground electrode of said electrode section is set to (N+½) times an electrical length of a wavelength of a signal applied to said signal electrode, where N is an integer.

2. The optical device according to claim 1, wherein said electrode section has said signal electrode, and two ground electrodes adjacently disposed on sides thereof, and
    said optical waveguide is formed so as to pass through an area under said signal electrode and areas under said ground electrodes.

3. The optical device according to claim 2, wherein said optical waveguide is formed on said substrate while being folded a plurality of times in a longitudinal direction of said substrate so as to pass through one of said ground electrodes, an area under said signal electrode, and an area under the other ground electrode, in this sequence.

4. The optical device according to claim 1, wherein said electrode section includes a first electrode section extending in a longitudinal direction of said substrate; a curved electrode section, one end of which is in mutual communication with said first electrode section and which has a curved folded geometry; and a second electrode section which is in mutual communication with a remaining end of said curved electrode section and extends in said longitudinal direction of said substrate; and
    said optical waveguide includes a first optical waveguide section extending along areas under signal electrodes of said first and second electrode sections, and a second optical waveguide section which is in mutual communication with said first optical waveguide section and extends along areas under ground electrodes of said first and second electrode sections.

5. The optical device according to claim 4, wherein said first optical waveguide section and said second optical waveguide section are in mutual communication with each other by way of a folded waveguide section.

6. The optical device according to claim 1, wherein
    said electrode section includes a first electrode section extending in a longitudinal direction of said substrate, a first curved electrode section whose one end is in mutual communication with said first electrode section and has a curved folded geometry, a second electrode section which is in mutual communication with a remaining end of said first curved electrode section and extends in a longitudinal direction of said substrate, a second curved electrode section which is in mutual communication with said second electrode section and has a curved folded geometry, and a third electrode section which is in mutual communication with said second curved electrode section and extends in said longitudinal direction of said substrate; and
    said optical waveguide includes a first optical waveguide section extending along areas under signal electrodes of said first, second, and third electrode sections and a second optical waveguide section which is in mutual communication with said first optical waveguide section and extends along areas under ground electrodes of said first and second electrode sections.

7. The optical device according to claim 4, wherein an intersecting waveguide section is formed at an intersection of said first optical waveguide section and said second optical waveguide section.

8. The optical device according to claim 2, wherein
    said electrode section includes a first electrode section extending in a longitudinal direction of said substrate, a first curved electrode section whose one end is in mutual communication with a remaining end of said first electrode section and has a curved folded geometry, a second electrode section which is in mutual communication with said first curved electrode section and extends in a longitudinal direction of said substrate, a second curved electrode section which is in mutual communication with said second electrode section and has a curved folded geometry, and a third electrode section which is in mutual communication with said second curved electrode section and extends in a longitudinal direction of said substrate; and
    said optical waveguide includes a first optical waveguide section extending along an area under said one ground electrode of said first, second, and third electrode sections, a second optical waveguide section which is in mutual communication with said first optical waveguide section and extends along areas under signal electrodes of said first, second, and third electrode sections, and a third optical waveguide section which is in mutual communication with said second optical waveguide section and extends along an area under said remaining ground electrode of said first, second, and third electrode sections.

9. The optical device according to claim 8, wherein a first intersecting waveguide section is formed at an intersection of said first optical waveguide section and said second optical waveguide section; and
- a second intersecting waveguide section is formed at an intersection of said second optical waveguide section and said third optical waveguide section.

10. The optical device according to claim 1, wherein said electrode section is formed so as to extend in a longitudinal direction of said substrate;
- said optical waveguide has a first optical waveguide section extending along an area under said signal electrode of said electrode section and a second optical waveguide section extending along an area under said ground electrode of said electrode section; and
- an output of said first optical waveguide section and an input of said second optical waveguide section are connected together by means of an optical fiber.

11. The optical device according to claim 1, wherein light propagates through said optical waveguide in the same direction at a position where said light is exposed to an electric field emitted from said signal electrode of said electrode section and a position where said light is exposed to an electric field converging to said ground electrode of said electrode section.

12. The optical device according to claim 5, wherein said folded waveguide section is formed through use of a mirror which reflects light from said first optical waveguide section to said second optical waveguide section.

13. The optical device according to claim 5, wherein said folded waveguide section is formed from a semicircularly-curved waveguide.

14. The optical device according to claim 13, wherein a groove section is formed in said substrate along outer portions of said curved waveguide.

15. The optical device according to claim 1, wherein a groove section is provided in said substrate on both sides of said optical waveguide located in an area under either said signal electrode or said ground electrode, or areas under both said signal electrode and said ground electrode.

16. The optical device according to claim 1, wherein a signal frequency applied to said signal electrode is an integral multiple of a frequency of 12.5 GHz or a frequency close to 12.5 GHz.

17. An optical device, comprising:
- a substrate having an electro-optical effect;
- an optical waveguide formed in said substrate; and
- an electrode section which has a signal electrode and a ground electrode for applying an electric field to said optical waveguide, wherein
- said optical waveguide is formed so as to pass through, in a predetermined sequence, a position where said light propagating through said optical waveguide is exposed to said electric field emitted from said signal electrode of said electrode section and a position where said light is exposed to said electric field converging to said ground electrode of said electrode section, and
- wherein the length of said optical waveguide from a position where said light is exposed to said electric field emitted from said signal electrode of said electrode section to a position where said light is exposed to said electric field converging to said ground electrode of said electrode section is set to $(N+1/2)$ (N is an integer) times an electrical length of a wavelength of a signal applied to said signal electrode.

18. The optical device according to claim 1, wherein an effective refraction factor of said optical waveguide falls within a range of ±2% of an effective refraction factor of said electrode section.

19. The optical device according to claim 1, wherein the width of said ground electrode is set to 20 μm or less.

20. An optical device comprising:
- a substrate having an electro-optical effect;
- a pair of intensity modulation optical waveguides formed in said substrate;
- a phase modulation optical waveguide which is in mutual communication with said pair of optical waveguides;
- an intensity modulation electrode section which is formed from a signal electrode and a ground electrode for applying an intensity modulation electric field to said intensity modulation optical waveguide in order to control the phase of light propagating through said pair of intensity modulation optical waveguides; and
- a phase modulation electrode section which is formed from a signal electrode and a ground electrode for applying a phase modulation electric field to said phase modulation optical waveguide in order to control the phase of light propagating through said phase modulation optical waveguide, wherein said phase modulation optical waveguide is formed so as to pass a position where said light is exposed to said phase modulation electric field emitted from said signal electrode of said phase modulation electrode section and either or both a position where said light is exposed to said phase modulation electric field converging toward said ground electrode of said phase modulation electrode section and a position where said light is exposed to an intensity modulation electric field converging to said ground electrode of said intensity modulation electrode section.

21. An optical device comprising:
- a substrate having an electro-optical effect;
- an optical waveguide formed in said substrate; and
- an electric field emission electrode and an electric field convergence electrode to which an electric field emitted from said electric field emission electrode converges, wherein
- a part of said optical waveguide is formed on a position where said optical waveguide is under said electric field emission electrode and another part of said optical waveguide is formed on a position where said optical waveguide is under said electric field convergence electrode, and
- a length of said optical waveguide from a position in which light is exposed to said electric field emitted from said signal electrode of said electrode section to a position in which said light is exposed to said electric field converging to said ground electrode of said electrode section is set to $(N+\frac{1}{2})$ times an electrical length of a wavelength of a signal applied to said signal electrode, where N is an integer.

22. An optical device comprising:
- a substrate having an electro-optical effect;
- an optical waveguide formed in said substrate; and
- an electrode section which has a signal electrode and a ground electrode for applying an electric field to said optical waveguide, wherein
- said optical waveguide has a first optical waveguide section extending along an area under said signal electrode of said electrode section and a second optical waveguide section extending along an area under said ground electrode of said electrode section, and an output of said first optical waveguide section and an input of said second optical waveguide section are connected together by means of an optical fiber.

23. An optical device comprising:
a substrate having an electro-optical effect;
an optical waveguide formed in said substrate; and
an electrode section which has a signal electrode and a ground electrode for applying an electric field to said optical waveguide, wherein
the optical waveguide is formed in the substrate while being folded a plurality of times in a longitudinal direction of the substrate so as to pass through an area under the ground electrode after having passed through an area under the signal electrode, and
a length of said optical waveguide from a position in which light is exposed to said electric field emitted from said signal electrode of said electrode section to a position in which said light is exposed to said electric field converging to said ground electrode of said electrode section is set to $(N+\frac{1}{2})$ times an electrical length of a wavelength of a signal applied to said signal electrode, where N is an integer.

* * * * *

UNITED STATES PATENT AND TRADEMARK OFFICE
CERTIFICATE OF CORRECTION

PATENT NO. : 7,603,002 B2
APPLICATION NO. : 11/144615
DATED : October 13, 2009
INVENTOR(S) : Masaki Sugiyama It is certified that error appears in the above-identified patent and that said Letters Patent is hereby corrected as shown below:

Column 27, Line 62, claim 17 change "$(N+/1;2)$" to --$(N+½)$--.

Signed and Sealed this

Fifth Day of January, 2010

David J. Kappos
*Director of the United States Patent and Trademark Office*